(12) United States Patent
Blok et al.

(10) Patent No.: US 7,951,871 B2
(45) Date of Patent: May 31, 2011

(54) CURING RUBBER BY HYDROSILATION

(75) Inventors: Edward J. Blok, Wadsworth, OH (US); Maria D. Ellul, Silver Lake Village, OH (US); Alfred V. Pickett, Akron, OH (US); Carl Voellmecke, Akron, OH (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 920 days.

(21) Appl. No.: 11/595,377

(22) Filed: Nov. 10, 2006

(65) Prior Publication Data

US 2008/0114126 A1    May 15, 2008

(51) Int. Cl.
*C08F 8/00* (2006.01)
(52) U.S. Cl. .................................. 525/105; 525/192
(58) Field of Classification Search .................. 525/192, 525/105
See application file for complete search history.

(56) References Cited

U.S. PATENT DOCUMENTS

| | | | |
|---|---|---|---|
| 4,311,628 A | 1/1982 | Abdou-Sabet et al. | |
| 4,540,753 A | 9/1985 | Cozewith et al. | |
| 4,707,531 A | 11/1987 | Shirahata | |
| 4,803,244 A | 2/1989 | Umpleby | |
| 5,100,947 A | 3/1992 | Puydak et al. | |
| 5,124,212 A | 6/1992 | Lee et al. | |
| 5,157,081 A | 10/1992 | Puydak et al. | |
| 5,290,866 A | 3/1994 | Dobreski et al. | |
| 5,380,770 A | 1/1995 | Doin et al. | |
| 5,397,832 A | 3/1995 | Ellul | |
| 5,672,660 A | 9/1997 | Medsker et al. | |
| 5,936,028 A | 8/1999 | Medsker et al. | |
| 6,251,998 B1 * | 6/2001 | Medsker et al. | 525/192 |
| 6,268,438 B1 | 7/2001 | Ellul et al. | |
| 6,342,324 B1 | 1/2002 | Li et al. | |
| 6,451,915 B1 | 9/2002 | Ellul et al. | |
| 6,476,132 B1 * | 11/2002 | Abdou-Sabet et al. | 525/100 |
| 6,491,613 B2 | 12/2002 | Takeda et al. | |
| 6,503,984 B2 * | 1/2003 | Johnson et al. | 525/70 |
| 6,613,185 B1 * | 9/2003 | Valade et al. | 156/329 |
| 6,811,725 B2 | 11/2004 | Nguyen et al. | |
| 6,864,315 B1 | 3/2005 | Hakuta et al. | |
| 6,867,260 B2 | 3/2005 | Datta et al. | |
| 6,884,850 B2 | 4/2005 | Schauder et al. | |
| 6,939,918 B2 * | 9/2005 | Ellul et al. | 525/191 |
| 6,972,309 B1 | 12/2005 | Wideman et al. | |
| 7,271,218 B2 * | 9/2007 | Wideman et al. | 525/105 |
| 2004/0092643 A1 * | 5/2004 | Tiburtius et al. | 524/492 |
| 2004/0236042 A1 | 11/2004 | Datta et al. | |
| 2005/0107534 A1 | 5/2005 | Datta et al. | |
| 2005/0148727 A1 | 7/2005 | Ajbani et al. | 525/63 |
| 2006/0293457 A1 | 12/2006 | Nadella et al. | 525/192 |
| 2009/0050851 A1 * | 2/2009 | Sato et al. | 252/301.36 |

FOREIGN PATENT DOCUMENTS

| | | |
|---|---|---|
| EP | 0 651 009 | 5/1995 |
| EP | 1 739 127 | 1/2007 |
| WO | WO 93/03093 | 2/1993 |
| WO | WO 2007/001601 | 1/2007 |
| WO | WO 2007/035401 | 3/2007 |

OTHER PUBLICATIONS

Abstract—JP 2004035695 (May 2, 2004).
L. Lewis, et al.; "Hydrosilylation Catalyzed by Metal Colloids: A Relative Activity Study", *Organometallics*, 9, p. 621-625, (1990).
L. Lewis, "On the Mechanism of Metal Colloid Catalyzed Hydrosilylation: Proposed Explanations for Electronic Effects and Oxygen Cocatalysts", *J. Am. Chem. Soc.*, 112, p. 5998-6004, (1990).
J. Stein, et al, "Mechanistic Studies of Platnum-Catalyzed Hydrosilylation", *J. Inorganic and Organometallic Polymers*, vol. 1, No. 3, p. 325-334, (1991).
G. Ver Strate et al., "*Near Monodisperse Ethylene-Propylene Copolymers by Direct Zieglet-Natta Polymerization. Preparation, Characterization, Properties*", Macromolecules, 1988, vol. 21, pp. 3360-3371.
M. Ellul et al., "*Crosslink Densities and Phase Morphologies in Dynamically Vulcanized TPEs*", Rubber Chemistry and Technology, 1995, vol. 68, pp. 573-584.
Morton, M. Ed., Rubber Technology Third Edition, Chapman & Hall, London, 1995, Chapter 1, "*Introduction to Polymer Science*," pp. 11-16.
Keltan Material Safety Data, EPDM P597, DSM Elastomers Americas, Aug. 31, 1999 (downloaded from www.dysson.com/pdf/keltan_pds_p597.pdf; www.dysson.com/pdf/keltan_msds_us_oil.pdf).

* cited by examiner

*Primary Examiner* — Mark Eashoo
*Assistant Examiner* — David Karst
(74) *Attorney, Agent, or Firm* — Kevin M. Faulkner

(57) ABSTRACT

A method for preparing a thermoplastic vulcanizate, the method comprising dynamically vulcanizing a rubber within a blend that includes the rubber and a thermoplastic polymer, where said dynamically vulcanizing is effected with a cure system that includes a hydrosilating agent and a catalyst, where the hydrosilating agent includes a compound including at least 3 silicon hydride groups defined by the formula

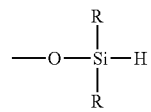

where each R is independently a monovalent organic group or hydrogen, and where the silicon atoms of the respective silicon hydride groups are spatially separated by at least 6 atoms.

29 Claims, No Drawings

CURING RUBBER BY HYDROSILATION

FIELD OF THE INVENTION

One or more embodiments of the present invention are directed toward thermoplastic vulcanizates prepared by employing particular hydrosilating agents. Other embodiments are directed toward thermosets cured with particular hydrosilating agents.

BACKGROUND OF THE INVENTION

Thermoplastic elastomers are known. They have many of the properties of thermoset elastomers, yet they are processable as thermoplastics. One type of thermoplastic elastomer is a thermoplastic vulcanizate, which may be characterized by finely-divided rubber particles dispersed within a plastic. These rubber particles are crosslinked to promote elasticity.

For example, U.S. Pat. No. 4,803,244 teaches the preparation of thermoplastic elastomers by admixing, under reaction conditions, an unsaturated elastomer containing carbon-carbon double bonds, an essentially saturated thermoplastic polymer, a multifunctional organosilicon compound containing an average of at least two Si—H groups per molecule, and a catalyst capable of hydrosilylating the carbon-carbon double bonds of the unsaturated elastomer. Examples of multi-functional organosilicon compounds include polymethylhydrodimethylsiloxane copolymers terminated with trimethylsiloxy groups or alkoxy groups; polymethylhydrosiloxane polymers similarly terminated; polymethylhydrodimethylsiloxane methylsiloxane terpolymers similarly terminated; bis(dimethylsilyl)benzene; bis(dimethylsilyl)alkanes; and silicone fluids, provided that they contain an average of at least two Si—H groups per molecule.

U.S. Pat. No. 5,672,660 teaches improved thermoplastic vulcanizates prepared by dynamic curing—through hydrosilation—in the presence of a platinum-containing catalyst, a diene-containing rubber having predominantly sterically unhindered carbon-carbon double bonds. For example, the diene-containing rubber may include units deriving from 5-vinyl-2-norbornene, which provides an unhindered carbon-carbon double bond. The patent further teaches the use of hydrosilating agents, which include at least two silicon hydride groups, such as methylhydrogen polysiloxanes, methylhydrogen dimethylsiloxane copolymers, alkyl methyl polysiloxanes, bis(dimethylsilyl)alkanes and bis(dimethylsilyl)benzene.

Unfortunately, the availability of diene-containing rubbers that include desirable unhindered carbon-carbon double bonds is limited. For example, ethylene-propylene rubbers containing units deriving from 5-vinyl-2-norbornene are not widely available, especially where the rubber includes significant levels of diene incorporation. While ethylene-propylene rubbers containing diene units deriving from 5-ethylidene-2-norbornene are more widely available, the ability to cure these rubbers by way of hydrosilation, particularly when dynamically vulcanizing rubber to form a thermoplastic vulcanizate, requires a significant amount of platinum catalyst, which can be disadvantageous due to the costs associated with the catalyst. There is therefore a desire to develop technology to more efficiently hydrosilate widely available ethylene-propylene rubbers, such as those containing units from 5-ethylidene-2-norbornene.

Hydrosilating agents have also been employed to cure unsaturated rubbers to form thermoset compositions. For example, U.S. Pat. No. 6,972,309 teaches curable compositions made by blending polyisoprene rubber with a hydrosilation catalyst and a crosslinking agent. The crosslinking agent includes at least two hydrosilyl groups per molecule and may be defined by the formula

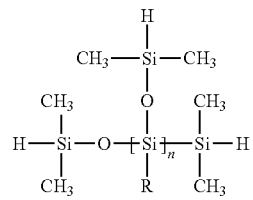

wherein n represents an integer from 1 to about 3 and R represents an alkyl group containing from 1 to 4 carbon atoms, a phenyl group, or a hydrosilyl group. The use of these crosslinking agents does not effectively cure sterically hindered vinyl groups like those deriving from 5-ethylidene-2-norbornene. There is therefore a desire to discover or develop a more efficient crosslinking agent for these types of rubbers.

SUMMARY OF THE INVENTION

One or more embodiments of the present invention provides a method for preparing a thermoplastic vulcanizate, the method comprising dynamically vulcanizing a rubber within a blend that includes the rubber and a thermoplastic polymer, where said dynamically vulcanizing is effected with a cure system that includes a hydrosilating agent and a catalyst, where the hydrosilating agent includes a compound including at least 3 silicon hydride groups defined by the formula

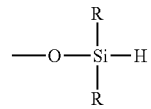

where each R is independently a monovalent organic group or hydrogen, and where the silicon atoms of the respective silicon hydride groups are spatially separated by at least 6 atoms.

One or more embodiments of the present invention also provide a thermoplastic vulcanizate prepared by dynamically vulcanizing a rubber within a blend that includes the rubber and a thermoplastic polymer, where said dynamically vulcanizing is effected with a cure system that includes a hydrosilating agent and a catalyst, where the hydrosilating agent includes a compound including at least 3 silicon hydride groups defined by the formula

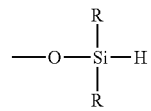

where each R is independently a monovalent organic group or hydrogen, and where the silicon atoms of the respective silicon hydride groups are spatially separated by at least 6 atoms.

One or more embodiments of the present invention further provides a method for preparing a thermoset, the method comprising curing an olefinic rubber with a hydrosilating agent in the presence of a catalyst, where the hydrosilating agent includes a compound including at least 3 silicon hydride groups defined by the formula

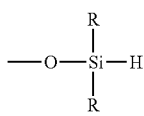

where each R is independently a monovalent organic group or hydrogen, and where the silicon atoms of the respective silicon hydride groups are spatially separated by at least 6 atoms.

DETAILED DESCRIPTION OF ILLUSTRATIVE EMBODIMENTS

One or more embodiments of the present invention are directed toward a method for preparing a thermoplastic vulcanizate by employing a hydrosilating agent that demonstrates improved reactivity toward unsaturated rubber. As a result, the processes of the invention are particularly advantageous for curing rubbers that include carbon-carbon double bonds that have previously been difficult to hydrosilate (e.g., carbon-carbon double bonds deriving from 5-ethylidene-2-norbornene). The use of the hydrosilating agents according to the present invention has also advantageously provided thermoplastic vulcanizates demonstrating long term stability as evidenced by improved compression set. This has occurred even with rubbers that include carbon-carbon double bonds that have proven to have greater hydrosilation cure efficiency (e.g., 5-vinyl-2-norbornene). Also, the processes of the present invention are advantageous for producing thermoset compositions.

In one or more embodiments, the thermoplastic vulcanizates are prepared by dynamically curing a rubber with the advantageous hydrosilating agent in the presence of a catalyst while the rubber is mixed with a thermoplastic polymer. The resulting composition includes a crosslinked or cured phase and an uncrosslinked phase. The crosslinked phase includes a crosslinked rubber, and the uncrosslinked phase includes a thermoplastic polymer. In other embodiments, thermoset compositions may be prepared by curing an olefinic rubber with the advantageous hydrosilating agent.

Rubber

Rubbers include those polymers that are capable of being cured or crosslinked by hydrosilation. Reference to a rubber may include mixtures of more than one rubber. Non-limiting examples of rubbers include olefinic elastomeric copolymers, butyl rubber, natural rubber, styrene-butadiene copolymer rubber, butadiene rubber, acrylonitrile rubber, butadiene-styrene-vinyl pyridine rubber, urethane rubber, polyisoprene rubber, epichlorohydrin terpolymer rubber, polychloroprene, and mixtures thereof. In one or more embodiments, olefinic elastomeric copolymers include ethylene-propylene rubbers, propylene-based rubbery copolymers, and ethylene-based plastomers.

Ethylene-Propylene Rubber

The term ethylene-propylene rubber refers to rubbery copolymers polymerized from ethylene, at least one α-olefin monomer, and optionally at least one diene monomer. The α-olefins may include, but are not limited to, propylene, 1-butene, 1-hexene, 4-methyl-1-pentene, 1-octene, 1-decene, or combinations thereof. In one embodiment, the α-olefins include propylene, 1-hexene, 1-octene or combinations thereof. The diene monomers may include, but are not limited to, 5-ethylidene-2-norbornene; 5-vinyl-2-norbornene; divinyl benzene; 1,4-hexadiene; 5-methylene-2-norbornene; 1,6-octadiene; 5-methyl-1,4-hexadiene; 3,7-dimethyl-1,6-octadiene; 1,3-cyclopentadiene; 1,4-cyclohexadiene; dicyclopentadiene; or a combination thereof. In the event that the copolymer is prepared from ethylene, α-olefin, and diene monomers, the copolymer may be referred to as a terpolymer or even a tetrapolymer in the event that multiple α-olefins or dienes are used. In one or more embodiments, a blend of at least two distinct rubbers is employed where a first rubber includes diene units deriving from 5-ethylidene-2-norbornene and a second rubber includes units deriving from 5-vinyl-2-norbornene. In yet another embodiment, the rubber includes a tetrapolymer including units deriving from both 5-ethylidene-2-norbornene and 5-vinyl-2-norbornene.

In one or more embodiments, the ethylene-propylene rubber includes from about 12 to about 85% by weight, or from about 20 to about 80% by weight, or from about 40 to about 70% by weight, or from about 60 to about 66% by weight ethylene units deriving from ethylene monomer, and from about 0.1 to about 15% by weight, or from about 0.5 to about 12% by weight, or from about 1 to about 10% by weight, or from about 2 to about 8% by weight diene units deriving from diene monomer, with the balance including α-olefin units deriving from α-olefin monomer (e.g., $C_3$-$C_{10}$ olefins such as propylene). Expressed in mole percent, the terpolymer of one embodiment includes from about 0.1 to about 5 mole percent, or from about 0.5 to about 4 mole percent, or from about 1 to about 2.5 mole percent diene units deriving from diene monomer. In one or more embodiments, where the diene includes 5-ethylidene-2-norbornene, the ethylene-propylene rubber may include at least 1% by weight, in other embodiments at least 3% by weight, in other embodiments at least 4% by weight, in other embodiments at least 5% by weight, in other embodiments from about 1 to about 15% by weight, in other embodiments from about 5% to about 12% by weight, and in other embodiments from about 7% to about 11% by weight units deriving from 5-ethylidene-2-norbornene.

In one or more embodiments, ethylene-propylene rubber may have a weight average molecular weight ($M_w$) that is greater than 100,000 g/mole, in other embodiments greater than 200,000 g/mole, in other embodiments greater than 400,000 g/mole, and in other embodiments greater than 600,000 g/mole; in these or other embodiments, the Mw of the preferred ethylene-propylene rubber is less than 1,200,000 g/mole, in other embodiments less than 1,000,000 g/mole, in other embodiments less than 900,000 g/mole, and in other embodiments less than 800,000 g/mole. In one or more embodiments, useful ethylene-propylene rubbers have a number average molecular weight ($M_n$) that is greater than 20,000 g/mole, in other embodiments greater than 60,000 g/mole, in other embodiments greater than 100,000 g/mole, and in other embodiments greater than 150,000 g/mole; in these or other embodiments, the $M_w$ of the ethylene-propylene rubbers of one or more embodiments is less than 500,000 g/mole, in other embodiments less than 400,000 g/mole, in other embodiments less than 300,000 g/mole, and in other embodiments less than 250,000 g/mole. Techniques for determining the molecular weight ($M_n$, $M_w$ and $M_z$) and molecular weight distribution (MWD) may be found in U.S. Pat. No. 4,540,753 (Cozewith, Ju and Verstrate) (which is incorporated by reference herein for purposes of U.S. practices) and references cited therein and in 21 Macromolecules 3360 (Verstrate et al., 1988), which is herein incorporated by reference for purposes of U.S. practices, and references cited therein.

In one or more embodiments, ethylene-propylene rubber may also be characterized by having a Mooney viscosity ($ML_{(1+4)}$ at 125° C.) per ASTM D-1646, of from about 10 to about 500 or from about 50 to about 450.

In one or more embodiments, ethylene-propylene rubber may be characterized by having an intrinsic viscosity, as measured in Decalin at 135° C. per ASTM D-1601, of from about 1 to about 8 dl/g, or from about 3 to about 7 dl/g, or from about 4 to about 6.5 dl/g.

In one or more embodiments, the ethylene-propylene rubber may be characterized by a glass transition temperature ($T_g$), as determined by Differential Scanning Calorimetry (DSC) according to ASTM E 1356, that is less than −20° C., in other embodiments less than −30° C., in other embodiments less than −50° C., and in other embodiments from about −20 to about −60° C.

Ethylene-propylene rubber may be manufactured or synthesized by using a variety of techniques. For example, these copolymers can be synthesized by employing solution, slurry, or gas phase polymerization techniques that employ various catalyst systems including Ziegler-Natta systems including vanadium catalysts and take place in various phases such as solution, slurry, or gas phase. Exemplary catalysts include single-site catalysts including constrained geometry catalysts and Group IV-VI metallocenes, and Brookhart catalysts. Elastomeric copolymers are commercially available under the tradenames Vistalon™ (ExxonMobil Chemical Co.; Houston, Tex.), Keltan™ (DSM Copolymers; Baton Rouge, La.), Nordel™ IP (DuPont Dow Elastomers; Wilmington, Del.), NORDEL MG™ (DuPont Dow Elastomers), Royalene™ (Chemtura) and Buna™ (Lanxess).

Ethylene-Based Plastomer

In one or more embodiments, the ethylene-based plastomers, which may also be referred to as ethylene-α-olefin copolymers, include copolymers of ethylene and one or more α-olefin comonomers. The α-olefin comonomers may include 1-butene, 1-hexene, 1-octene, 1-nonene, 1-decene, 4-methyl-1-pentene, and mixtures thereof.

In one or more embodiments, the ethylene-α-olefin copolymers may include at least 15 weight percent, in other embodiments at least 30 weight percent, and in other embodiments at least 50 weight percent units deriving from the α-olefin comonomer based upon the total weight of the copolymer. In these or other embodiments, the ethylene-α-olefin copolymers may include less than 55 weight percent, in other embodiments less than 45 weight percent, and in other embodiments less than 40 weight percent units deriving from the α-olefin comonomer based upon the total weight of the copolymer.

In one or more embodiments, the ethylene-α-olefin copolymer may be characterized by a density, as determined at room temperature per ASTM D-792, that is less than 0.900 g/cc, in other embodiments less than 0.870 g/cc, in other embodiments less than 0.865 g/cc, and in other embodiments less than 0.860 g/cc; in these or other embodiments, the ethylene-α-olefin copolymers may be characterized by a density of at least 0.850 g/cc, and in other embodiments at least 0.860 g/cc.

In one or more embodiments, the ethylene-α-olefin copolymers may be characterized by a $T_g$, as determined by DSC, that is less than −20° C., in other embodiments less than −30° C., in other embodiments less than −50° C., and in other embodiments from about −20° C. to about −60° C.

In one or more embodiments, the ethylene-α-olefin copolymer can have a melt index, according to ASTM 1238 using 2.16 kg load at 190° C., of less than 100 dg/min, in other embodiments less than 50 dg/min, in other embodiments less than 35 dg/min, in other embodiments less than 15 dg/min, and in other embodiments from about 0.1 to about 100 dg/min.

In one or more embodiments, the ethylene-α-olefin copolymers may be characterized by a narrow compositional distribution breadth index, as determined by using the procedure set forth in WO 93/03093, above 60%, in other embodiments above 75%, and in other embodiments above 90%.

Propylene-Based Rubbery Copolymer

In one or more embodiments, the propylene-based rubbery copolymer, which may also be referred to as propylene-α-olefin copolymers, include units (i.e., mer units) derived from propylene, one or more comonomer units derived from ethylene or α-olefins including from 4 to about 20 carbon atoms, and optionally one or more comonomer units derived from dienes. In one or more embodiments, the α-olefin comonomer units may derive from ethylene, 1-butene, 1-hexane, 4-methyl-1-pentene and/or 1-octene. In one or more embodiments, the diene comonomer units may derive from 5-ethylidene-2-norbornene, 5-vinyl-2-norbornene, divinyl benzene, 1,4-hexadiene, 5-methylene-2-norbornene, 1,6-octadiene, 5-methyl-1,4-hexadiene, 3,7-dimethyl-1,6-octadiene, 1,3-cyclopentadiene, 1,4-cyclohexadiene, dicyclopentadiene, or a combination thereof. The embodiments described below are discussed with reference to ethylene as the α-olefin comonomer, but the embodiments are equally applicable to other copolymers with other α-olefin comonomers. In this regard, the copolymer may simply be referred to as propylene-based rubbery copolymers with reference to ethylene as the α-olefin.

In one or more embodiments, the propylene-based rubbery copolymers may include at least 5% by weight, in other embodiments at least 6% by weight, in other embodiments at least 8% by weight, and in other embodiments at least 10% by weight ethylene-derived units; in these or other embodiments, the copolymers may include up to 35% by weight, in other embodiments up to 32% by weight, in other embodiments up to 25% by weight, and in other embodiments up to 20% by weight ethylene-derived units, where the percentage by weight is based upon the total weight of the propylene-derived, α-olefin derived units, and diene-derived units. Stated another way, the propylene-based rubbery copolymers may include at least 75% by weight, or in other embodiments at least 80% by weight, propylene-derived units; and in these or other embodiments, the copolymers may include up to 95% by weight, in other embodiments up to 94% by weight, in other embodiments up to 92% by weight, and in other embodiments up to 90% by weight propylene-derived units, where the percentage by weight is based upon the total weight of the propylene-derived, and diene derived mer units.

In one or more embodiments, the propylene-based rubbery copolymers may include at least 0.5% by weight, in other embodiments at least 1.5% by weight, and in other embodiments at least 3% by weight diene-derived units; in these or other embodiments, the propylene-based rubbery copolymers may include up to 11% by weight, in other embodiments up to 6% by weight, and in other embodiments up to 4% by weight diene-derived units, where the percentage by weight is based upon the total weight of the propylene-derived, ethylene-derived, and diene-derived units.

The propylene-based rubbery copolymers in one or more embodiments of this invention are characterized by having a single melting temperature as determined by differential scanning calorimetry (DSC). The melting point is defined as the temperature of the greatest heat absorption within the range of melting of the sample. The propylene-based rubbery copolymer may show secondary melting peaks adjacent to the principal peak, but for purposes herein, these secondary melting peaks are considered together as a single melting point, with the highest of these peaks being considered the melting point ($T_m$) of the propylene-based rubbery copolymer. In one or more embodiments, the $T_m$ of the propylene-based rubbery copolymer is less than 110° C., in other embodiments less than 90° C., in other embodiments less than 80° C., and in other embodiments less than 70° C.; in these or other embodiments, the propylene-based rubbery copolymer has a $T_m$ of at least 25° C., in other embodiments at least of 35° C., in other embodiments at least of 40° C., and in other embodiments at least of 45° C.

In one or more embodiments, the propylene-based rubbery copolymer may be characterized by a heat of fusion (Hf), as determined according to DSC procedures according to ASTM E 793. This may be determined by placing 6 to 10 mg of sample into DSC equipment and heating the sample at about 10° C./min. In one or more embodiments, the propylene-based rubbery copolymer may be characterized by a heat of fusion that is at least 0.5 J/g, in other embodiments at least 1.0 J/g, in other embodiments at least 1.5 J/g, in other embodiments at least 3.0, in other embodiments at least 4.0, in other embodiments at least 6.0, and in other embodiments at least 7.0. In these or other embodiments, the propylene-based rubbery copolymer may be characterized by a heat of fusion that of less than 80 J/g, in other embodiments less than 70 J/g, in other embodiments less than 60 J/g, in other embodiments less than 50 J/g, in other embodiments less than 40 J/g, in other embodiments up to 40 J/g, and in other embodiments less than 30 J/g.

The propylene-based rubbery copolymer can have a triad tacticity of three propylene units, as measured by $^{13}C$ NMR, of 75% or greater, 80% or greater, 82% or greater, 85% or greater, or 90% or greater. In one or more embodiments, ranges include from about 50 to about 99%, in other embodiments from about 60 to about 99%, in other embodiments from about 75 to about 99%, in other embodiments from about 80 to about 99%, and in other embodiments from about 60 to about 97%. Triad tacticity is determined by the methods described in U.S. Patent Application Publication No. 2004/0236042.

In one or more embodiments, the propylene-based rubbery copolymer may have a % crystallinity of from 0.5% to 40%, in other embodiments 1% to 30%, and in other embodiments 5% to 25%. Crystallinity may be determined according to DSC procedures in accordance with ASTM E-794-95. This may be determined by placing 6 to 10 mg of sample into DSC equipment and heating the sample at about 10° C./min. For use herein, the crystallinity of the propylene-ethylene polymer can also be expressed in terms of percentage of crystallinity. The thermal energy for the highest order of polypropylene is estimated at 209 J/g (i.e., 100% crystallinity is equal to 209 J/g). In other embodiments, the propylene-ethylene polymer may have a crystallinity of less than 40%, in other embodiments about 0.25% to about 25%, in other embodiments from about 0.5% to about 22%, and in other embodiments from about 0.5% to about 20%.

In one or more embodiments, the propylene-based rubbery copolymer can have a density of about 0.85 g/cm³ to about 0.92 g/cm³, in other embodiments about 0.87 g/cm³ to 0.90 g/cm³, and in other embodiments from about 0.88 g/cm³ to about 0.89 g/cm³ at room temperature as measured per the ASTM D-792 test method.

In one or more embodiments, the propylene-based rubbery copolymer can have an melt index (MI) (ASTM D-1238, 2.16 kg @ 190° C.), of less than 10 dg/min, in other embodiments≦6.5 dg/min, in other embodiments≦6 dg/min, in other embodiments≦5.5 dg/min, and in other embodiments≦5 dg/min.

In one or more embodiments, the propylene-based rubbery copolymer can have a melt flow rate (MFR), as measured according to the ASTM D-1238, 2.16 kg weight @ 230° C., equal to or greater than 0.2 dg/min, in other embodiments of at least 0.2 dg/min, in other embodiments at least 0.5 dg/min, and in other embodiments at least 1.0 dg/min. In these or other embodiments, the melt flow rate may be equal to or less than 350 dg/min, and in other embodiments less than 100 dg/min. In an embodiment, the propylene-based polymer has MFR of 0.5 dg/min to 350 dg/min, in other embodiments from 2 dg/min to 30 dg/min, in other embodiments from 5 dg/min to 30 dg/min, in other embodiments 10 dg/min to 30 dg/min, and in other embodiments 10 dg/min to about 25 dg/min.

In one or more embodiments, the propylene-based rubbery copolymers may have a Mooney viscosity [ML (1+4) @ 125° C.], as determined according to ASTM D-1646, of less than 100, in other embodiments less than 75, in other embodiments less than 60, and in other embodiments less than 30.

In one or more embodiments, the propylene-based rubbery copolymer can have a $M_w$ of about 5,000 to about 5,000,000 g/mole, in other embodiments a $M_w$ of about 10,000 to about 1,000,000 g/mole, in other embodiments a $M_w$ of about 20,000 to about 500,000, g/mole and in other embodiments a $M_w$ of about 50,000 to about 400,000 g/mole.

In one or more embodiments, the propylene-based rubbery copolymer can have a $M_n$ of about 2,500 to about 2,500,000 g/mole, in other embodiments a $M_n$ of about 5,000 to about 500,000 g/mole, in other embodiments a $M_n$ of about 10,000 to about 250,000 g/mole, and in other embodiments a $M_n$ of about 25,000 to about 200,000 g/mole.

In one or more embodiments, the propylene-based rubbery copolymer can have a Z-average molecular weight ($M_z$) of about 10,000 to about 7,000,000 g/mole, in other embodiments a $M_z$ of about 50,000 to about 1,000,000 g/mole, in other embodiments a $M_z$ of about 80,000 to about 700,000 g/mole, and in other embodiments a $M_z$ of about 100,000 to about 500,000 g/mole.

In one or more embodiments, the molecular weight distribution index (MWD=($M_w/M_n$)) of the propylene-based rubbery copolymer may be about 1 to about 40, in other embodiments about 1 to about 5, in other embodiments about 1.8 to about 5, and in other embodiments about 1.8 to about 3.

In one or more embodiments, butyl rubber includes copolymers and terpolymers of isobutylene and at least one other comonomer. Useful comonomers include isoprene, divinyl aromatic monomers, alkyl substituted vinyl aromatic monomers, and mixtures thereof. Exemplary divinyl aromatic monomers include vinyl styrene. Exemplary alkyl substituted vinyl aromatic monomers include α-methyl styrene and paramethyl styrene. These copolymers and terpolymers may also be halogenated such as in the case of chlorinated and brominated butyl rubber. In one or more embodiments, these halogenated polymers may derive from monomer such as parabromomethylstyrene.

In one or more embodiments, butyl rubber includes copolymers of isobutylene and isoprene, and copolymers of isobutylene and paramethyl styrene, terpolymers of isobutylene, isoprene, and divinyl styrene, branched butyl rubber, and brominated copolymers of isobutene and paramethylstyrene (yielding copolymers with parabromomethylstyrenyl mer units). These copolymers and terpolymers may be halogenated.

In one embodiment, where butyl rubber includes the isobutylene-isoprene copolymer, the copolymer may include from about 0.5 to about 30, or from about 0.8 to about 5, percent by weight isoprene based on the entire weight of the copolymer with the remainder being isobutylene.

In another embodiment, where butyl rubber includes isobutylene-paramethyl styrene copolymer, the copolymer may include from about 0.5 to about 25, and from about 2 to about 20, percent by weight paramethyl styrene based on the entire weight of the copolymer with the remainder being isobutylene. In one embodiment, isobutylene-paramethyl styrene copolymers can be halogenated, such as with bromine, and these halogenated copolymers can contain from about 0 to about 10 percent by weight, or from about 0.3 to about 7 percent by weight halogenation.

In other embodiments, where butyl rubber includes isobutylene-isoprene-divinyl styrene, the terpolymer may include from about 95 to about 99, or from about 96 to about 98.5, percent by weight isobutylene, and from about 0.5 to about 5, or from about 0.8 to about 2.5, percent by weight isoprene based on the entire weight of the terpolymer, with the balance being divinyl styrene.

In the case of halogenated butyl rubbers, the butyl rubber may include from about 0.1 to about 10, or from about 0.3 to about 7, or from about 0.5 to about 3 percent by weight halogen based upon the entire weight of the copolymer or terpolymer.

In one or more embodiments, the $T_g$ of useful butyl rubber can be less than about $-55°$ C., or less than about $-58°$ C., or less than about $-60°$ C., or less than about $-63°$ C.

In one or more embodiments, the Mooney viscosity ($ML_{1+8}$@125° C.) of useful butyl rubber can be from about 25 to about 75, or from about 30 to about 60, or from about 40 to about 55.

Butyl rubber can be obtained from a number of commercial sources as disclosed in the Rubber World Blue Book. For example, both halogenated and un-halogenated copolymers of isobutylene and isoprene are available under the tradename Exxon Butyl™ (ExxonMobil Chemical Co.), halogenated and un-halogenated copolymers of isobutylene and paramethyl styrene are available under the tradename EXXPRO™ (ExxonMobil Chemical Co.), star branched butyl rubbers are available under the tradename STAR BRANCHED BUTYL™ (ExxonMobil Chemical Co.), and copolymers containing parabromomethylstyrenyl mer units are available under the tradename EXXPRO 3745 (ExxonMobil Chemical Co.). Halogenated and non-halogenated terpolymers of isobutylene, isoprene, and divinyl styrene are available under the tradename Polysar Butyl™ (Lanxess; Germany).

Thermoplastics

Any thermoplastic resin that can be employed in the manufacture of thermoplastic vulcanizates can be used to manufacture the thermoplastic vulcanizates of this invention. Useful thermoplastic resins may include solid, generally high molecular weight plastic resins. In one or more embodiments, these thermoplastic resins include un-functionalized resins. In other embodiments, the thermoplastic component of the thermoplastic vulcanizate may include a functionalized thermoplastic resin either alone or in combination with an unfunctionalized resin.

These resins may include crystalline and semi-crystalline polymers. In one or more embodiments, these resins may be characterized by a crystallinity of at least 25% by weight, in other embodiments at least 30% by weight, and in other embodiments at least 35% by weight. Crystallinity may be determined by dividing the heat of fusion of a sample by the heat of fusion of a 100% crystalline polymer, which is assumed to be 209 joules/gram for polypropylene or 350 joules/gram for polyethylene. Where the thermoplastic resin of one or more embodiments is propylene-based, the resins may be characterized by a heat of fusion of at least 50 J/g, in other embodiments in excess of 75 J/g, and in other embodiments in excess of 100 J/g. Where the thermoplastic resins of one or more embodiments are polyethylene-based, they may be characterized by a heat of fusion of at least 85 J/g, in other embodiments at least 100 J/g, and in other embodiments at least 130 J/g.

In one or more embodiments, useful thermoplastic resins may be characterized by an $M_w$ of from about 50 to about 2,000 kg/mole, and in other embodiments from about 100 to about 600 kg/mole. They may also be characterized by a $M_n$ of about 25 to about 1,000 kg/mole, and in other embodiments about 50 to about 300 kg/mole, as measured by GPC with polystyrene standards.

In one or more embodiments, these thermoplastic resins can have a MFR (ASTM D-1238, 2.16 dg @ 230° C.) of about 0.2 to 5,000 dg/min, in other embodiments from about 5 to about 500 dg/min, and in other embodiments from about 10 to about 100 dg/min.

In one or more embodiments, these thermoplastic resins can have a $T_m$ that is from about 110° C. to about 250° C., in other embodiments from about 155° C. to about 170° C., and in other embodiments from about 160° C. to about 165° C. They may have a $T_g$ of from about $-10$ to about 10° C., in other embodiments from about $-3$ to about 5° C., and in other embodiments from about 0° C. to about 2° C. In one or more embodiments, they may have a crystallization temperature ($T_c$) of at least about 75° C., in other embodiments at least about 95° C., in other embodiments at least about 100° C., and in other embodiments at least 105° C., with one embodiment ranging from 105° to 115° C.

Exemplary thermoplastic polymers include crystalline, semi-crystalline, and crystallizable polyolefins, olefin copolymers, and non-olefin resins. The thermoplastic resins may be formed by polymerizing ethylene or $\alpha$-olefins such as propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene and ethylene and/or propylene with another $\alpha$-olefin such as 1-butene, 1-hexene, 1-octene, 2-methyl-1-propene, 3-methyl-1-pentene, 4-methyl-1-pentene, 5-methyl-1-hexene or mixtures thereof is also contemplated. Specifically included are the reactor, impact, and random copolymers of propylene with ethylene or the higher $\alpha$-olefins, described above, or with $C_{10}$-$C_{20}$ diolefins. Comonomer contents for these propylene copolymers may be from 1% to about 30% by weight of the polymer, for example, See U.S. Pat. No. 6,867,260 B2. Copolymers available under the tradename VISTAMAXX™ (ExxonMobil) are specifically included. Other polyolefin copolymers may include copolymers of olefins with styrene such as styrene-ethylene copolymer or polymers of olefins with $\alpha,\beta$-unsaturated acids, $\alpha,\beta$-unsaturated esters such as polyethylene-acrylate copolymers. Non-olefin thermoplastic polymers may include polymers and copolymers of styrene, $\alpha,\beta$-unsaturated acids, $\alpha,\beta$-unsaturated esters, and mixtures thereof. For example, polystyrene, polyacrylate, and polymethacrylate may be used. Blends or mixtures of two or more polyolefin thermoplastics such as described herein, or with other polymeric modifiers, are also suitable in accordance with this invention. Useful thermoplastic polymers may also include impact and reactor copolymers.

The thermoplastic polymers may be synthesized by using an appropriate polymerization technique known in the art such as, but not limited to, the conventional Ziegler-Natta type polymerizations, and catalysis employing single-site organometallic catalysts including, but not limited to, metallocene catalysts.

In one embodiment, the thermoplastic resin includes a homopolymer of a high-crystallinity isotactic or syndiotactic polypropylene. This polypropylene can have a density of from about 0.85 to about 0.91 g/cc, with the largely isotactic polypropylene having a density of from about 0.90 to about 0.91 g/cc. Also, high and ultra-high molecular weight polypropylene that has a fractional melt flow rate can be employed. In one or more embodiments, polypropylene resins may be characterized by a MFR (ASTM D-1238; 2.16 dg @ 230° C.) that is less than or equal to 10 dg/min, in other embodiments less than or equal to 1.0 dg/min, and in other embodiments less than or equal to 0.5 dg/min.

Other Constituents

In one or more embodiments, the thermoplastic vulcanizates may include a mineral oil, a synthetic oil, or a combination thereof. These oils may also be referred to as plasticizers or extenders. Mineral oils may include aromatic, naphthenic, paraffinic, and isoparaffinic oils. In one or more embodiments, the mineral oils may be treated or untreated. Useful mineral oils can be obtained under the tradename SUNPAR™ (Sun Chemicals). Others are available under the name PARALUX™ (Chevron).

In one or more embodiments, synthetic oils include polymers and oligomers of butenes including isobutene, 1-butene, 2-butene, butadiene, and mixtures thereof. In one or more embodiments, these oligomers can be characterized by a number average molecular weight ($M_n$) of from about 300 g/mole to about 9,000 g/mole, and in other embodiments from about 700 g/mole to about 1,300 g/mole. In one or more embodiments, these oligomers include isobutenyl mer units. Exemplary synthetic oils include polyisobutylene, poly(isobutylene-co-butene), polybutadiene, poly(butadiene-co-butene), and mixtures thereof. In one or more embodiments, synthetic oils may include polylinear α-olefins, polybranched α-olefins, hydrogenated polyalphaolefins, and mixtures thereof.

In one or more embodiments, the synthetic oils include synthetic polymers or copolymers having a viscosity in excess of about 20 cp, in other embodiments in excess of about 100 cp, and in other embodiments in excess of about 190 cp, where the viscosity is measured by a Brookfield viscometer according to ASTM D-4402 at 38° C. In these or other embodiments, the viscosity of these oils can be less than 4,000 cp and in other embodiments less than 1,000 cp.

Useful synthetic oils can be commercially obtained under the tradenames Polybutene™ (Soltex; Houston, Tex.), Indopol™ (BP; Great Britain), and Parapol™ (ExxonMobil). Oligomeric copolymers deriving from butadiene and its comonomers are commercially available under the tradename Ricon Resin™ (Sartomer). White synthetic oil is available under the tradename SPECTRASYN™ (ExxonMobil), formerly SHF Fluids (Mobil) and Elevast™ (ExxonMobil).

In one or more embodiments, the extender oils may include organic esters, alkyl ethers, or combinations thereof. In one or more embodiments, the organic esters and alkyl ether esters may have a molecular weight that is generally less than about 10,000. In one or more embodiments, suitable esters include monomeric and oligomeric materials having an average molecular weight of below about 2,000 and in other embodiments below about 600. In one or more embodiments, the esters may be compatible or miscible with both the polyalphaolefin and rubber components of the composition; i.e., they may mix with other components to form a single phase. In one or more embodiments, the esters include aliphatic mono- or diesters, or alternatively oligomeric aliphatic esters or alkyl ether esters. In one or more embodiments, the thermoplastic vulcanizates are devoid of polymeric aliphatic esters and aromatic esters, as well as phosphate esters.

In certain embodiments, the thermoplastic vulcanizate may include a polymeric processing additive. The processing additive may be a polymeric resin that has a very high melt flow index. These polymeric resins include both linear and branched polymers that have a melt flow rate that is greater than about 500 dg/min, more preferably greater than about 750 dg/min, even more preferably greater than about 1000 dg/min, still more preferably greater than about 1200 dg/min, and still more preferably greater than about 1500 dg/min. Mixtures of various branched or various linear polymeric processing additives, as well as mixtures of both linear and branched polymeric processing additives, can be employed. Reference to polymeric processing additives can include both linear and branched additives unless otherwise specified. Linear polymeric processing additives include polypropylene homopolymers, and branched polymeric processing additives include diene-modified polypropylene polymers.

In addition to the rubber, thermoplastic resins, and optional processing additives, the thermoplastic vulcanizates of the invention may optionally include reinforcing and non-reinforcing fillers, antioxidants, stabilizers, rubber processing oil, lubricants, anti-blocking agents, anti-static agents, waxes, foaming agents, pigments, flame retardants and other processing aids known in the rubber compounding art. These additives can comprise up to about 50 weight percent of the total composition. Fillers and extenders that can be utilized include conventional inorganics such as calcium carbonate, clays, silica, talc, titanium dioxide, carbon black and the like.

In one or more embodiments, the thermoplastic vulcanizates of this invention contain a sufficient amount of the rubber to form rubbery compositions of matter. The skilled artisan will understand that rubbery compositions of matter include those that have ultimate elongations greater than 100 percent, and that quickly retract to 150 percent or less of their original length within about 10 minutes after being stretched to 200 percent of their original length and held at 200 percent of their original length for about 10 minutes.

Thus, in one or more embodiments, the thermoplastic vulcanizates can include at least about 25 percent by weight, in other embodiments at least about 45 percent by weight, in other embodiments at least about 65 percent by weight, and in other embodiments at least about 75 percent by weight rubber. In these or other embodiments, the amount of rubber within the thermoplastic vulcanizates can be from about 15 to about 90 percent by weight, in other embodiments from about 45 to about 85 percent by weight, and in other embodiments from about 60 to about 80 percent by weight, based on the entire weight of the rubber and thermoplastic combined.

In one or more embodiments, the amount of thermoplastic polymer within the thermoplastic vulcanizates can be from about 5% to about 60% by weight, in other embodiments from about 10% to about 40% by weight and in other embodiments from about 12% to about 30%, based on the entire weight of the rubber and thermoplastic combined.

When employed, the thermoplastic vulcanizates may include from about 0 to about 5 parts by weight, or from about 0.1 to about 3 parts by weight, or from about 0.2 to about 2 parts by weight of a polymeric processing additive per 100 parts by weight rubber.

With respect to the oil, the thermoplastic vulcanizate may include from about 0 to about 250 parts by weight, or from about 50 to about 150 parts by weight, or from about 75 to about 130 parts by weight, of extender oil per 100 parts rubber. The quantity of extender oil added depends upon the properties desired, with the upper limit depending upon the compatibility of the particular oil and blend ingredients; this limit is exceeded when excessive exuding of extender oil occurs. The amount of extender oil depends, at least in part, upon the type of rubber. High viscosity rubbers are more highly oil extendable.

Fillers, such as carbon black, clay, talc, or calcium carbonate may be added in amount from about 1 to about 250 parts by weight, in other embodiments from about 10 to about 150 parts by weight, and in other embodiments from about 25 to about 50 parts by weight, per 100 parts by weight of rubber. The amount of carbon black that can be used may depend, at least in part, upon the type of carbon black and the amount of extender oil that is used.

Vulcanization

In one or more embodiments, the rubber is cured or crosslinked by dynamic vulcanization. The term dynamic vulcanization refers to a vulcanization or curing process for a rubber contained in a blend with a thermoplastic resin, wherein the rubber is crosslinked or vulcanized under conditions of high shear at a temperature above the melting point of the thermoplastic.

In one or more embodiments, dynamic vulcanization is effected with a hydrosilating agent. Hydrosilating agents are typically used in conjunction with a catalyst. The hydrosilating agent employed in one or more embodiments includes at least three SiH-containing reactive moieties or substituents that may be defined by the formula

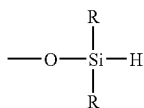

where each R is independently a monovalent organic group or hydrogen. In one or more embodiments, each R is independently a monovalent organic group.

Monovalent organic groups may include hydrocarbyl groups such as, but not limited to, alkyl, cycloalkyl, substituted cycloalkyl, alkenyl, cycloalkenyl, substituted cycloalkenyl, aryl, allyl, substituted aryl, arylalkyl, alkylaryl, and alkynyl groups, each group may contain from 1 carbon atom, or the appropriate minimum number of carbon atoms to form the group, up to 20 carbon atoms. These hydrocarbyl groups may contain heteroatoms such as, but not limited to, nitrogen, oxygen, silicon, sulfur, and phosphorus atoms. In certain embodiments, each R is independently a short-chain hydrocarbyl group. In specific embodiments, each R is a methyl or ethyl group, and in other embodiments each R is a methyl group.

Further, the hydrosilating agents may be characterized by including at least 6 atoms positioned between the silicon atoms of at least 2 of the SiH-containing moieties. In other words, at least 2 of the 3 SiH-containing reactive moieties are spatially separated by at least 6 atoms. In certain embodiments, each of the silicon atoms of the at least 3 SiH-containing reactive moieties are separated by at least 6 atoms. In these or other embodiments, each silicon atom of each SiH-containing moiety is spaced by at least 6 atoms from the nearest silicon atom of the nearest SiH-containing moiety. In particular embodiments, the hydrosilating agent includes at least 3, in other embodiments at least 4, and in other embodiments at least 5 of the SiH-containing reactive moieties. In these or other embodiments, the silicon atoms of the SiH-containing reactive moieties are separated by at least 7, in other embodiments at least 8, and in other embodiments at least 9 atoms.

In one or more embodiments, the hydrosilating agents are characterized by being devoid of or only including limited numbers of certain silicon-containing groups. The particular silicon-containing groups that are limited include those defined by the formulae

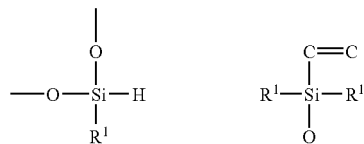

where each $R^1$ independently includes a monovalent organic group. In one or more embodiments, less than 20%, in other embodiments less than 10%, in other embodiments less than 5%, and in other embodiments less than 1% of the SiH-containing groups of the hydrosilating agent are positioned in these groups. In particular embodiments, the hydrosilating agent is substantially devoid of silicon atoms positioned in these groups, where substantially devoid refers to that amount, or less, that does not have an appreciable impact on the curing ability of the hydrosilating agent. In these or other embodiments, the hydrosilating agent is devoid of silicon atoms positioned in these groups.

In one or more embodiments, useful hydrosilating agents may be characterized by an activity of from about 3 to about 80, in other embodiments from about 4 to about 60, in other embodiments from about 5 to about 50, and in other embodiments from about 8 to about 40, where the activity is a measure of the number of hydride groups (i.e., equivalents of hydride groups) per kilogram of hydride compound.

In one or more embodiments, useful hydrosilating agents include those defined by the formula

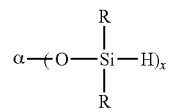

where each R is independently a monovalent organic group or hydrogen, where α is a moiety containing a sufficient number of atoms to allow at least 2 of the SiH-containing groups to be spatially separated by at least 6 atoms, and x is an integer of at least 2.

For example, in particular embodiments, α may include a Q group. In these or other embodiments, the hydrosilating agent may include at least 3 repeat units defined by the formula

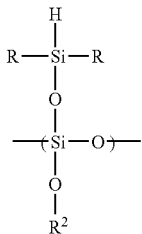

where each R is independently a monovalent organic group or hydrogen, and each $R^2$ is independently a monovalent organic group or a silicon-containing moiety such as a silicon hydride group.

In specific embodiments, the hydrosilating agent may include a resin defined by the formula

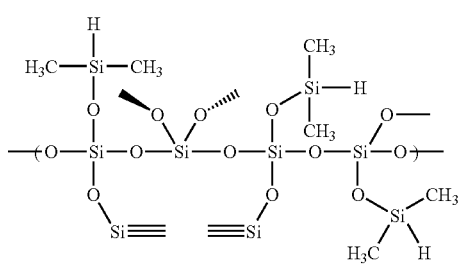

In one or more embodiments, these hydrosilating agents may be characterized by a molecular weight of from about 200 to about 800,000 g/mole, in other embodiments from about 300 to about 300,000 g/mole, and in other embodiments from about 400 about 150,000 g/mole.

Specific examples of hydrosilating agents where α includes a Q resin, which may also be referred to as HQ-type resins or hydride-modified silica Q resins, include those compounds that are commercially available under the tradename MQH-9™ (Clariant LSM, Inc.), which is a hydride-modified silica Q resin characterized by a molecular weight of 900 g/mole and an activity of 9.5 equivalents/kg; HQM 105™ (Gelest, Inc.), which is a hydride modified silica Q resin characterized by a molecular weight of 500 g/mole and an activity of 8-9 equivalents/kg; and HQM 107™ (Gelest, Inc), which is a hydride-modified silica Q resin characterized by a molecular weight of 900 g/mole and an activity of 8-9 equivalents/kg.

Other examples of α moieties include hydrocarbon polymer chains including branched polymer chains and dendritic polymers. These polymer or polymer chains may include hetero atoms including silicon atoms. For example, in one embodiment where α includes a branched hydrocarbon chain, the hydrosilating agent may be defined by the formula

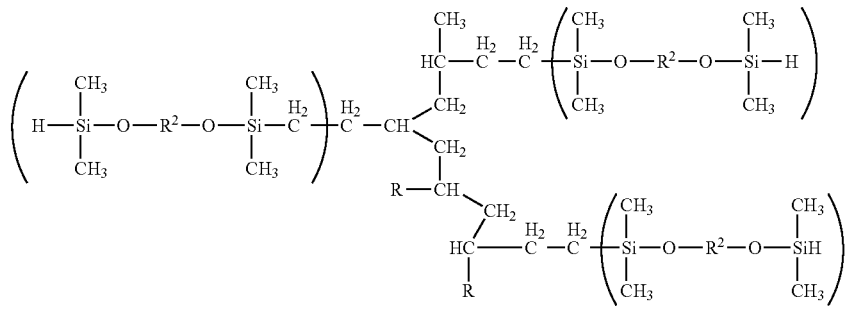

where each R is independently a monovalent organic group and each R2 is independently a divalent organic group. In one or more embodiments, divalent organic groups include a hydrocarbylene group or substituted hydrocarbylene group such as, but not limited to, alkylene, cycloalkylene, substituted alkylene, substituted cycloalkylene, alkenylene, cycloalkenylene, substituted alkenylene, substituted cycloalkenylene, arylene, and substituted arylene groups, with each group preferably containing from 1 carbon atom, or the appropriate minimum number of carbon atoms to form the group, up to about 20 carbon atoms. Substituted hydrocarbylene group includes a hydrocarbylene group in which one or more hydrogen atoms have been replaced by a substituent such as an alkyl group. The divalent organic groups may also contain one or more heteroatoms such as, but not limited to, nitrogen, oxygen, boron, silicon, sulfur, and phosphorus atoms.

Other examples include compounds defined by the formula

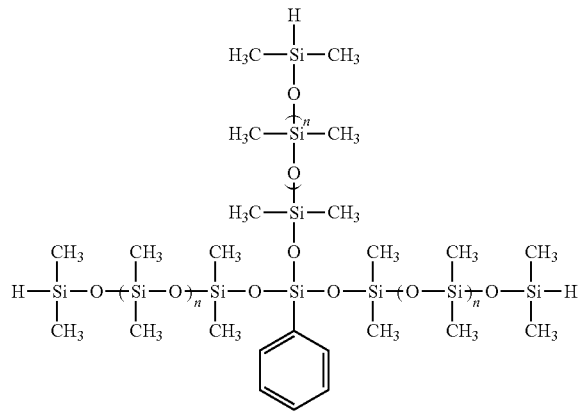

where each n is independently an integer from about 1 to about 1,000, in other embodiments from about 2 to about 100, and in other embodiments from about 3 to about 20.

Other examples include compounds defined by the formula

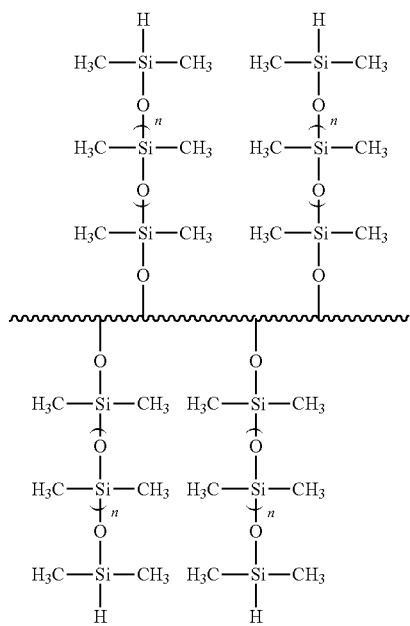

where ∼∼∼ is a polymer chain, and each n is independently an integer from about 0 to about 1,000, in other embodiments from about 1 to about 100, and in other embodiments from about 2 to about 20. In one or more embodiments, the polymer chain includes a polymer chain deriving from the polymerization of conjugated diene monomer optionally together with comonomer such as vinyl aromatic monomer.

Still other examples include compounds defined by the formula

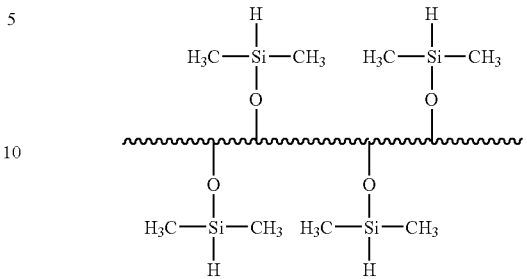

where ∼∼∼ is a polymer chain.

Useful catalysts include those compounds or molecules that can catalyze the hydrosilation reaction between a reactive SiH-containing moiety or substituent and a carbon-carbon bond such as a carbon-carbon double bond. Also, in one or more embodiments, these catalysts may be soluble within the reaction medium. Types of catalysts include transition metal compounds including those compounds that include a Group VIII metal. Exemplary Group VIII metals include palladium, rhodium, germanium, and platinum. Exemplary catalyst compounds include chloroplatinic acid, elemental platinum, chloroplatinic acid hexahydrate, complexes of chloroplatinic acid with sym-divinyltetramethyldisiloxane, dichloro-bis(triphenylphosphine) platinum (II), cis-dichloro-bis(acetonitrile) platinum (II), dicarbonyldichloroplatinum (II), platinum chloride, and platinum oxide, zero valent platinum metal complexes such as Karstedt's catalyst, solid platinum supported on a carrier (such as alumina, silica or carbon black), platinum-vinylsiloxane complexes {for instance: $Pt_n(ViMe_2SiOSiMe_2Vi)_n$ and $Pt[(MeViSiO)_4]_m$}, platinum-phosphine complexes {for example: $Pt(PPh_3)_4$ and $Pt(PBU_3)_4$}, and platinum-phosphite complexes {for instance: $Pt[P(OPh)_3]_4$ and $Pt[P(OBu)_3]_4$}, wherein Me represents methyl, Bu represents butyl, Vi represents vinyl and Ph represents phenyl, and n and m represent integers. Others include $RhCl(PPh_3)_3$, $RhCl_3$, $Rh/Al_2O_3$, $RuCl_3$, $IrCl_3$, $FeCl_3$, $AlCl_3$, $PdCl_2 \cdot 2H_2O$, $NiCl_2$, $TiCl_4$, and the like.

In one or more embodiments, the catalysts may be employed in conjunction with a catalysts inhibitor. These inhibitors may be particularly advantageous where thermoplastic vulcanizates are prepared by using dynamic vulcanization processes. Useful inhibitors include those compounds that stabilize or inhibit rapid catalyst reaction or decomposition. Exemplary inhibitors include olefins that are stable above 165° C. Other examples include 1,3,5,7,-tetravinyltetramethylcyclotetrasiloxane.

Those skilled in the art will be able to readily select an appropriate amount of hydrosilating agent to effect a desired cure. In one or more embodiments, the amount of hydrosilating agent employed may be expressed in terms of the ratio of silicon hydride equivalents (i.e., number of silicon hydride groups) to the equivalents of vinyl double bonds (e.g. number of diene-derived units on the polymer). In certain embodiments, a deficiency of silicon hydride is employed. In other embodiments, an excess of silicon hydride is employed. In one or more embodiments, the ratio of equivalents of silicon hydride to equivalents of vinyl bonds on the rubber is from about 0.7:1 to about 10:1, in other embodiments from about 0.95:1 to about 7:1, in other embodiments from 1:1 to 5:1, and in other embodiments from 1.5:1 to 4:1.

Those skilled in the art will be able to readily select an appropriate amount of catalyst to effect a desired cure. In one or more embodiments, from about 0.00007 parts by weight to about 0.01 parts by weight, in other embodiments from about 0.0001 parts by weight to about 0.0005 parts by weight, and in other embodiments from about 0.0005 parts by weight to about 0.001 parts by weight catalyst is employed per 100 parts by weight of rubber.

Despite the fact that the rubber may be partially or fully cured, the compositions of this invention can be processed and reprocessed by conventional plastic processing techniques such as extrusion, injection molding, blow molding, and compression molding. The rubber within these thermoplastic elastomers can be in the form of finely-divided and well-dispersed particles of vulcanized or cured rubber within a continuous thermoplastic phase or matrix. In other embodiments, a co-continuous morphology or a phase inversion can be achieved. In those embodiments where the cured rubber is in the form of finely-divided and well-dispersed particles within the thermoplastic medium, the rubber particles can have an average diameter that is less than 50 µm, optionally less than 30 µm, optionally less than 10 µm, optionally less than 5 µm, and optionally less than 1 µm. In certain embodiments, at least 50%, optionally at least 60%, and optionally at least 75% of the particles have an average diameter of less than 5 µm, optionally less than 2 µm, and optionally less than 1 µm.

In one or more embodiments, the rubber can be highly cured. In one embodiment, the rubber is advantageously completely or fully cured. The degree of cure can be measured by determining the amount of rubber that is extractable from the thermoplastic vulcanizate by using cyclohexane or boiling xylene as an extractant. This method is disclosed in U.S. Pat. No. 4,311,628, which is incorporated herein by reference for purpose of U.S. patent practice. In one embodiment, the rubber is partially cured and has a degree of cure not more than 90 weight percent, in other embodiments not more than 50 weight percent, in other embodiments not more than 30 weight percent, in other embodiments not more than 10 weight percent, and in other embodiments not more than 5 weight percent is extractable by cyclohexane at 23° C. as described in U.S. Pat. Nos. 5,100,947 and 5,157,081, which are incorporated herein by reference for purpose of U.S. patent practice. Alternatively, in one or more embodiments, the rubber has a degree of cure such that the crosslink density is preferably at least $4 \times 10^{-5}$, in other embodiments at least $7 \times 10^{-5}$, and in other embodiments at least $10 \times 10^{-5}$ moles per milliliter of rubber. See also "Crosslink Densities and Phase Morphologies in Dynamically Vulcanized TPEs," by Ellul et al., 68 RUBBER CHEMISTRY AND TECHNOLOGY 573-584 (1995).

The thermoplastic vulcanizates of this invention are useful for making a variety of articles such as weather seals, hoses, belts, gaskets, moldings, boots, elastic fibers and like articles. They are particularly useful for making articles by blow molding, extrusion, injection molding, thermo-forming, elasto-welding and compression molding techniques. More specifically, they are useful for making vehicle parts such as weather seals, brake parts such as cups, coupling disks, and diaphragm cups, boots for constant velocity joints and rack and pinion joints, tubing, sealing gaskets, parts of hydraulically or pneumatically operated apparatus, o-rings, pistons, valves, valve seats, valve guides, and other elastomeric polymer based parts or elastomeric polymers combined with other materials such as metal/plastic combination materials. Also contemplated are transmission belts including V-belts, toothed belts with truncated ribs containing fabric faced V's, ground short fiber reinforced V's or molded gum with short fiber flocked V's.

In other embodiments, thermosets may be prepared by employing the hydrosilating agents of this invention together with conventional techniques for forming thermosets. As with the thermoplastic vulcanizate embodiments, the hydrosilating agents, which are described above, may be employed in conjunction with a catalyst, which are also described above. Techniques for forming thermosets are generally known. In one or more embodiments, the thermosets are formed by static curing, such as may be accomplished in a mold or press. In other embodiments, cured films may be formed by forming a vulcanizable film with the rubber and cure system, and subsequently curing the film. In either event, the cure may be triggered or initiated by time and/or temperature.

In order to demonstrate the practice of the present invention, the following examples have been prepared and tested. The examples should not, however, be viewed as limiting the scope of the invention. The claims will serve to define the invention.

EXAMPLES

Throughout the examples, several hydrosilating agents were employed and compared for their effectiveness for either thermoplastic vulcanizate or thermoset systems. These hydrosilating agents include the following.

Hydrosilating Agent I was a hydride-modified silica Q resin that was obtained under the tradename HQM 107™ (Gelest, Inc.). This hydrosilating agent was characterized by a molecular weight of about 900 g/mole and an activity of about 8-9 equivalents/kg, and included at least 3 silicon hydride groups that are spatially separated by at least 6 atoms.

Hydrosilating Agent II was a methylhydrosiloxane-octylmethylsiloxane copolymer hydrosilating agent obtained under the tradename DC2-5084™ (Dow Corning), and was characterized by a molecular weight of 1,800 g/mole and an activity of 7.2 equivalents/kg, and included at least 3 silicon hydride groups, but they were not spatially separated by at least 6 atoms.

Hydrosilating agent III was a difunctional hydride terminated polydimethylsiloxane that was obtained under the tradename DMS H11™ (Gelest, Inc.), and was characterized by a molecular weight of 1,050 g/mole.

Hydrosilating agent IV was a difunctional hydride terminated polydimethylsiloxane that was purchased under the tradename DMS H03™ (Gelest, Inc.), and was characterized by a molecular weight of 450 g/mole.

Hydrosilating agent V was a phenyltris(dimethylsiloxy) curing agent that was obtained under the tradename SIP 6826™ (Gelest, Inc.), and was characterized by a molecular weight of 331 g/mol, and 3 silicon hydride groups per molecule, but these groups were not spatially separated by at least 6 atoms.

Hydrosilating agent VI was a tetrakis(dimethylsiloxy) curing agent that was obtained under the tradename SIT 7278™ (Gelest, Inc.), and was characterized by a molecular weight of 329 g/mol, and included 3 functionalities per molecule but these groups were not spatially separated by at least 6 atoms.

Hydrosilating agent VII was a hydride modified silica Q resin obtained under the tradename HQM 105™ (Gelest, Inc.), which was characterized by a molecular weight of 500 g/mole and an activity of 8-9 equivalents/kg, and included at least 3 silicon hydride groups that are spatially separated by at least 6 atoms.

Hydrosilating agent VIII was a hydride modified silica Q resin obtained under the tradename MQH-9™ (Clariant LSM, Inc.), which was characterized by a molecular weight of about 900 g/mole, an activity of 9.5 equivalents per kilogram, and included about 8.8 silicon hydride functionalities per molecule; at least two of the silicon hydride functionalities were separated by at least 6 atoms.

Samples 1-7

Table I sets forth the type and amount (in parts by weight per 100 parts by weight rubber) of the hydrosilating agent employed in each sample together with the results of physical testing that was performed on each sample. Those samples that correspond with the techniques of the present invention are designated with the letter "I," and those that are comparative are designated with the letter "C."

TABLE I

|  | Samples | | | | | | |
|---|---|---|---|---|---|---|---|
|  | 1 | 2 | 3 | 4 | 5 | 6 | 7 |
| Hydrosilating Agent (phr) | I | I | I | C | C | C | C |
| I | 1 | 2 | 3 | — | — | — | — |
| II | — | — | — | 1 | 2 | 3 | — |
| Phenolic Resin | — | — | — | — | — | — | 5.5 |
| Pt Catalyst (phr) | 0.069 | 0.069 | 0.069 | 0.069 | 0.069 | 0.069 | — |
| Properties of TPV |  |  |  |  |  |  |  |
| Average of | 3 | 3 | 4 | 3 | 3 | 3 | 4 |
| ISO Shore A | 58 | 63 | 64 | 53 | 58 | 60 | 67 |
| Ultimate Tensile Strength (MPa) | 4.32 | 5.16 | 5.71 | 3.36 | 4.19 | 5.33 | 5.63 |
| Ultimate Elongation (%) | 421 | 335 | 290 | 560 | 424 | 433 | 238 |
| M100 (MPa) | 1.98 | 2.48 | 2.99 | 1.60 | 1.99 | 2.41 | 3.24 |
| Aged Tension Set (%) | 10.8 | 8.0 | 5.9 | 16.7 | 12.5 | 9.7 | 5.3 |
| Weight Gain (%) | 174 | 104 | 92 | 289 | 230 | 153 | 83 |

Thermoplastic vulcanizates were prepared by dynamically vulcanizing an elastomeric copolymer within a Brabender mixer using conventional procedures. Vulcanization was effected with several different hydrosilating agents in the presence of a platinum catalyst.

The ingredients included 100 parts by weight of elastomeric copolymer (this amount refers only to the rubber component even though the rubber stock included 100 parts by weight rubber and 75 parts by weight oil), 50 parts by weight thermoplastic polymer, 125 total parts by weight oil (including 30 parts white oil obtained under the tradename Paralux™ 6001 (Chevron), 20 parts paraffinic oil obtained under the tradename Sunpar™ 150M, and 75 parts paraffinic oil that extended the rubber stock), 20 parts by weight clay, and 2 part by weight zinc oxide, each based on 100 parts by weight of the elastomeric copolymer.

The elastomeric copolymer was poly(ethylene-co-propylene-co-5-ethylidene-2-norbornene) characterized by having a diene content of about 4.5 weight percent, a Mooney viscosity $ML_{(1+4)}$@125° C. of about 52 (oil extended), an intrinsic viscosity (dl/g) in Decalin of about 4 dl/g, a weight average molecular weight of about 850 kg/mole, a number average molecular weight of about 170 kg/mole, an ethylene content of about 64 weight percent, an oil content of 75 phr (the parts by weight rubber simply refers to the amount of rubber even though the rubber stock included an oil), and was obtained under the tradename Vistalon™ 3666 (ExxonMobil). The thermoplastic resin was obtained under the tradename PP5341™ (ExxonMobil), and was characterized by 0.8 dg/min MFR. The filler was an anhydrous aluminum silicate obtained under the tradename ICECAP™ K. The catalyst for Samples 1-6 was a 2.2 weight percent active platinum catalyst with a cyclovinylsiloxane ligand obtained under the tradename PC085™. Sample 7 was cured with a phenolic resin, which was obtained under the tradename SP™ 1045 (Schenectady; Schenectady, N.Y.), and it was used in conjunction with 1.5 parts by weight stannous chloride dihydrate.

All test samples were prepared on compression-molded plaques having a thickness of 2.0 mm. Shore hardness was determined according to ISO 868 and/or per ASTM D-2240 with a 5 second time interval. Ultimate tensile strength, ultimate elongation, and 100% modulus were determined according to ASTM D-412 at 23□ C by using an Instron testing machine. Weight gain was determined according to ASTM D-471 after 24 hours at 121° C. Tension set was determined according to ASTM D-412 after the samples were subjected to accelerated heat aging within an air circulating oven at 70° C. for 22 hours elongated at 25%. Compression set was determined according to ASTM D-395(B) after the samples were subjected to 25% compression at 100° C. for one week.

The data in Table I shows that the thermoplastic vulcanizates prepared by employing hydrosilating agents according to the present invention are characterized by advantageous cure, as represented by lower weight gain, than the samples prepared by employing hydrosilating agents of the prior art (i.e., Samples 4-6). Also, when compared to the thermoplastic vulcanizates cured by phenolic resins (i.e., Sample 7), the thermoplastic vulcanizates of the present invention advantageously show near comparable cure state and were advantageously light (non-yellowish) in color and non-hygroscopic.

Samples 8-15

Eight vulcanizable compositions were prepared by mixing the composition within a Brabender mixer and curing the composition within a Moving Die Rheometer at 200° C. for 15 minutes. The torque, which is indicative of cure or crosslink density, was measured and recorded. Torque at 15 minutes is reported within the tables as Max Torque.

The vulcanizable compositions included 100 parts by weight rubber (exclusive of any oil extension), 20 parts by weight clay filler, 95 parts by weight oil (75 parts from rubber extension and 20 parts post added), and 2 parts by weight zinc oxide. Additionally, the vulcanizable compositions included a difunctional hydrosilating agent and a platinum catalyst; the amounts of these components are set forth in Table II.

The rubber was poly(ethylene-co-propylene-co-5-ethylidene-2-norbornene) characterized by having a diene content of about 4.5 weight percent, a Mooney viscosity $ML_{(1+4)}$@125° C. of about 52 (oil extended), an intrinsic viscosity (dl/g) in Decalin of about 4 dl/g, a weight average molecular weight of about 850 kg/mole, a number average molecular weight of about 170 kg/mole, an ethylene content of about 64 weight percent, an oil content of 75 phr (the parts by weight rubber simply refers to the amount of rubber even though the rubber stock included an oil), and was obtained under the tradename Vistalon™ 3666 (ExxonMobil). The filler was an anhydrous aluminum silicate obtained under the tradename ICECAP™ K. The catalyst was a 2.2 weight percent active platinum catalyst with a cyclicvinylsiloxane ligand obtained under the tradename PC085™.

TABLE II

|  | Samples | | | | | | | |
| --- | --- | --- | --- | --- | --- | --- | --- | --- |
|  | 8 | 9 | 10 | 11 | 12 | 13 | 14 | 15 |
| Invention/Comparison | C | C | C | C | C | C | C | C |
| Hydrosilating Agent (phr) | | | | | | | | |
| III | 0.68 | 1.30 | 2.60 | 7.50 | — | — | — | — |
| IV | — | — | — | — | 0.29 | 0.53 | 1.15 | 3.25 |
| Catalyst (phr) | 0.069 | 0.069 | 0.069 | 0.069 | 0.069 | 0.069 | 0.069 | 0.069 |
| Max Torque (dNm) | 1.4 | 1.2 | 1.2 | 1.2 | 1.4 | 1.4 | 1.4 | 1.4 |

The results shown in Table II indicate that the difunctional hydrosilating agents do not crosslink the rubber to a technologically useful extent as evidenced by the low torque values.

Samples 16-21

In a manner similar to Samples 8-15, five additional vulcanizable compositions were prepared, cured, and analyzed to determine cure effectiveness.

The ingredients employed in these samples were the same as those employed in Samples 8-15 except for the hydrosilating agents. The cure agents and amount of catalyst employed are set forth in Table III.

TABLE III

|  | Samples | | | | | |
| --- | --- | --- | --- | --- | --- | --- |
|  | 16 | 17 | 18 | 19 | 20 | 21 |
| Invention/Comparison | C | C | C | I | I | I |
| Hydrosilating Agent (phr) | | | | | | |
| II | 2 | 3 | 3 | — | — | — |
| VII | — | — | — | 1 | 2 | 3 |
| Catalyst (phr) | 0.069 | 0.069 | 0.138 | 0.069 | 0.069 | 0.069 |
| Average of | 4 | 4 | 2 | 4 | 4 | 4 |
| Max Torque (dNm) | 5.9 | 6.6 | 7.7 | 6.8 | 9.6 | 10.6 |

The data in Table III shows that the use of hydrosilating agents in accordance with invention achieve advantageous cure over those employed in the prior art.

Samples 22-26

Five additional vulcanizable compositions were prepared, cured, and analyzed in a similar fashion to Samples 16-21. The vulcanizable compositions included 100 parts by weight rubber, 75 parts by weight oil, and the cure system as provided in Table IV.

The rubber was poly(ethylene-co-propylene-co-5-ethylidene-2-norbornene) characterized by having a diene content of about 4.5 weight percent, a Mooney viscosity $ML_{(1+4)}$@125° C. of about 52 (oil extended), an intrinsic viscosity (dl/g) in Decalin of about 4 dl/g, a weight average molecular weight of about 850 kg/mole, a number average molecular weight of about 170 kg/mole, an ethylene content of about 64 weight percent, an oil content of 75 phr (the parts by weight rubber simply refers to the amount of rubber even though the rubber stock included an oil), and was obtained under the tradename Vistalon™ 3666 (ExxonMobil). The filler was an anhydrous aluminum silicate obtained under the tradename ICECAP™ K. The catalyst was a 2.2 weight percent active platinum catalyst with a cyclicvinylsiloxane ligand obtained under the tradename PC085™.

TABLE IV

|  | Samples | | | | |
| --- | --- | --- | --- | --- | --- |
|  | 22 | 23 | 24 | 25 | 26 |
| Invention/Comparison | I | C | C | C | C |
| Hydrosilating Agent (phr) | | | | | |
| VIII | 3 | — | — | — | — |
| V | — | 3 | 3.14 | — | — |
| VI | — | — | — | 2.34 | 3 |
| Catalyst (phr) | 0.069 | 0.069 | 0.069 | 0.069 | 0.069 |
| Average of | 2 | 2 | 2 | 2 | 2 |
| Max torque (dNm) | 13.0 | 8.0 | 8.0 | 7.7 | 7.4 |

The data in Table IV shows that hydrosilating curatives in accordance with the present invention achieve advantageous cure over prior art curatives even when the prior art curative levels are increased to match the activity of the curative of the present invention.

Samples 27-34

Eight additional vulcanizable compositions were prepared, cured, and analyzed in a similar fashion to Samples 22-26. The vulcanizable compositions included 100 parts by weight rubber, 100 parts by weight white oil, 5 parts by weight clay filler, 2 parts by weight zinc oxide, and the cure system as provided in Table V.

The rubber was poly(ethylene-co-propylene-co-5-ethylidene-2-norbornene) characterized by having a diene content of about 9.0 weight percent, a Mooney viscosity $ML_{(1+4)}$@125° C. of about 45 (oil extended), a weight average molecular weight of about 504 kg/mole, a number average molecular weight of about 198 kg/mole, an ethylene content of about 63 weight percent, a white oil content of 100 phr (the parts by weight rubber simply refers to the amount of rubber even though the rubber stock included an oil). The filler was an anhydrous aluminum silicate obtained under the tradename ICECAP™ K. The catalyst was a 2.2 weight percent active platinum catalyst with a cyclovinylsiloxane ligand obtained under the tradename PC085™.

TABLE V

| | Samples | | | | | | | |
|---|---|---|---|---|---|---|---|---|
| | 27 | 28 | 29 | 30 | 31 | 32 | 33 | 34 |
| Invention/Comparison | C | C | I | I | I | I | I | I |
| Hydrosilating Agent (phr) | | | | | | | | |
| II | 2 | 2 | — | — | — | — | — | — |
| VII | — | — | 2 | 2 | — | — | — | — |
| VIII | — | — | — | — | 3 | 4 | 6 | 6 |
| Catalyst (phr) | 0.035 | 0.069 | 0.035 | 0.069 | 0.069 | 0.069 | 0.069 | 0.069 |
| Average of | 1 | 1 | 2 | 2 | 3 | 3 | 2 | 2 |
| Max torque (dNm) | 3.4 | 4.3 | 7.9 | 8.6 | 14.7 | 16.3 | 17.7 | 14.4 |

The data in Table V likewise shows that hydrosilating agents employed in accordance with the present invention outperform those employed in the prior art. Additionally, the data shows that a very high state of cure can be achieved even at low catalyst levels. Furthermore, the data demonstrates the advantages associated with the use of higher ENB and a white oil (i.e., Paralux™ 3001), which is believed to include less impurities that may impact catalyst performance.

Samples 35-37

Three additional vulcanizable compositions were prepared, cured, and analyzed in a similar fashion to Samples 27-34. The vulcanizable compositions included 100 parts by weight rubber, 100 parts by weight oil, 5 parts by weight clay filler, 2 parts by weight zinc oxide, and the cure system as provided in Table VI.

The rubber was a tetra polymer including units deriving from ethylene, propylene, 5-ethylidene-2-norbornene, and 5-vinyl-2-norbornene. The tetrapolymer was characterized by having a 5-ethylidene-2-norbornene diene content of about 4.1 weight percent, a 5-vinyl-2-norbornene content of about 0.3 weight percent, a Mooney viscosity $ML_{(1+4)}$@125° C. of about 52 (oil extended), an intrinsic viscosity (dl/g) in Decalin of about 5.2 dl/g, a weight average molecular weight of about 737 kg/mole, a number average molecular weight of about 260 kg/mole, an ethylene content of about 64 weight percent, an oil content of 100 phr (the parts by weight rubber simply refers to the amount of rubber even though the rubber stock included an oil), and was obtained under the tradename Keltan Terpo™ (DSM). The filler was an anhydrous aluminum silicate obtained under the tradename ICECAP™ K. The catalyst was a 2.2 weight percent active platinum catalyst with a cyclovinylsiloxane ligand obtained under the tradename PC085™.

TABLE VI

| | Samples | | |
|---|---|---|---|
| | 35 | 36 | 37 |
| Invention/Comparison | C | I | I |
| Hydrosilating Agent (phr) | | | |
| I | 2 | — | — |
| VII | — | 2 | 2 |
| Catalyst (phr) | 0.035 | 0.035 | 0.069 |
| Average of | 2 | 3 | 3 |
| Max torque (dNm) | 7.6 | 10.3 | 11.8 |

The data in Table VI suggests that the hydrosilating agents employed in the present invention are efficient in effecting cure of hindered double bonds such as those deriving from 5-ethylidene-2-norbornene. As has been demonstrated in the art, double bonds deriving from 5-vinyl-2-norbornene can be effectively cured with prior art hydrosilating agents, which is confirmed by the cure observed with Sample 35. Even though the same rubber was employed in Samples 36 and 37, a cure superior to that of Sample 35 was achieved with the hydrosilating agents employed in the present invention. This superior cure can be attributed to crosslinking of the double bonds derived from 5-ethylidene-2-norbornene.

Samples 38-40

Three additional vulcanizable compositions were prepared, cured, and analyzed in a similar fashion to Samples 35-37. The vulcanizable compositions included 100 parts by weight rubber, and the cure system as provided in Table VII.

The rubber was a propylene-based rubbery copolymer prepared in accordance with International Publication No. 2005/0107534 A1 and/or U.S. Pat. No. 6,268,438 B1. The rubber was a terpolymer including units deriving from ethylene, propylene, and 5-ethylidene-2-norbornene. The terpolymer was characterized by having a 5-ethylidene-2-norbornene diene content of about 2.1 weight percent, a number average molecular weight of about 69 kg/mole, a polydispersity of about 2.1, and an ethylene content of about 15 weight percent. The filler was an anhydrous aluminum silicate obtained under the tradename ICECAP™ K. The catalyst was a 2.2 weight percent active platinum catalyst with a cyclovinylsiloxane ligand obtained under the tradename PC085™.

TABLE VII

| | Samples | | |
|---|---|---|---|
| | 34 | 35 | 36 |
| Invention/Comparison | I | C | C |
| Hydrosilating Agent (phr) | | | |
| I | 1.5 | — | — |
| II | — | 1.5 | 1.88 |
| Catalyst (phr) | 0.02 | 0.02 | 0.02 |
| Average of | 2 | 2 | 2 |
| Max torque (dNm) | 12.3 | 6.2 | 6.8 |

The data in Table VII shows that even with a distinct rubber, the use of hydrosilating agents according to the present invention provides significant advantage over those curatives employed in the prior art. Additionally, the use of this particular rubber, which is non-oil extended, can be cured according to the present invention in the presence of low levels of catalyst. It is believed that the low levels of catalyst can be employed inasmuch as the absence of oil reduces catalyst interference.

Samples 41-50

Ten additional vulcanizable compositions where prepared, cured, and analyzed in a similar fashion to samples 8-15. The vulcanizate compositions included 100 parts by weight rubber, a white oil, and a cure system as provided in Table VIII. Samples 41-44 included a first rubber that was a poly(ethylene-co-propylene-co-5-vinyl-2-norbornene) that was characterized by having a diene content of about 0.7% weight percent, a Mooney viscosity $ML_{(1+4)}$@125° C. of about 52 (oil extended), an intrinsic viscosity (dl/g) in Decalin of about 5.0 dl/g, a weight average molecular weight of about 950 kg/mole, a number average molecular weight of about 120 kg/mole, a $M_w/M_n$ of 7.9, an ethylene content of about 63 weight percent, a white oil content of 100 phr (the parts by weight rubber simply refers to the amount of rubber even though the rubber stock included an oil); this rubber may be referred to as 0.7% VNB rubber. Samples 45-50 included the second rubber that was a poly(ethylene-co-propylene-co-5-vinyl-2-norbornene) that was characterized by having a diene content of about 3% weight percent, a Mooney viscosity $ML_{(1+4)}$@125° C. of about 35 (oil extended), an intrinsic viscosity (dl/g) in Decalin of about 2.2 dl/g, a weight average molecular weight of about 870 kg/mole, a number average molecular weight of about 63 kg/mole, a $M_w/M_n$ of 14, an ethylene content of about 63 weight percent, a white oil content of 75 phr; this rubber may be referred to as 3% VNB Rubber. Both rubbers were prepared by using Ziegler Natta catalysis. An additional 25 parts by weight oil was added to Samples 45-50 so that each sample included 100 parts white oil.

TABLE VIII

| | Samples | | | | | | | | | |
|---|---|---|---|---|---|---|---|---|---|---|
| | 41 | 42 | 43 | 44 | 45 | 46 | 47 | 48 | 49 | 50 |
| Invention/Comparison | I | I | I | I | I | I | I | I | I | I |
| 0.7% VNB Rubber | 100 | 100 | 100 | 100 | — | — | — | — | — | — |
| 3% VNB Rubber | — | — | — | — | 100 | 100 | 100 | 100 | 100 | 100 |
| Hydrosilating Agent (phr) | | | | | | | | | | |
| II | 2 | 3 | — | — | 2 | 3 | 4 | — | — | — |
| VIII | — | — | 2 | 3 | — | — | — | 2 | 3 | 4 |
| Catalyst (phr) | 0.014 | 0.014 | 0.014 | 0.014 | 0.014 | 0.014 | 0.014 | 0.014 | 0.014 | 0.014 |
| Average of | 2 | 2 | 2 | 2 | 2 | 2 | 1 | 2 | 2 | 1 |
| Max Torque (dNm) | 8.9 | 9.3 | 8.8 | 8.0 | 6.0 | 8.0 | 9.4 | 7.2 | 9.6 | 10.6 |

The data in Table VIII shows increasing levels of cure can be achieved with an increase in diene content.

Samples 51-55

Using ingredients and procedures similar to those set forth in Samples 1-7, five additional thermoplastic vulcanizates were prepared by dynamically vulcanizing a rubber with a hydrosilating agent. The ingredients employed, including the particular hydrosilating agent employed in each sample, and the results of testing performed on the thermoplastic vulcanizate are provided in Table IX. The rubber employed in each of the samples was similar to that employed in Samples 45-50, which was a poly(ethylene-co-propylene-co-5-vinyl-2-norbornene) including 3% diene content. The stabilizer and antioxidant were added after dynamic vulcanization. Also, 20 parts by weight of the white oil, which was obtained under the tradename PARALUX™ 6001 (Chevron), was added after vulcanization. The thermoplastic resin was obtained under the tradename 51SO7A (Sunoco) and was characterized by a 0.7 dg/min MFR.

TABLE IX

| | Samples | | | | |
|---|---|---|---|---|---|
| | 51 | 52 | 53 | 54 | 55 |
| Invention/Comparison | C | C | I | I | I |
| 3% VNB Rubber | 175 | 175 | 175 | 175 | 175 |
| ZnO | 2 | 2 | 2 | 2 | 2 |
| Clay | 22 | 22 | 22 | 22 | 22 |
| White Oil | 30 | 30 | 30 | 30 | 30 |
| Thermoplastic | 56 | 56 | 56 | 56 | 56 |
| White Oil | 20 | 20 | 20 | 20 | 20 |
| Stabilizer | 0.25 | 0.25 | 0.25 | 0.25 | 0.25 |
| Antioxidant | 0.75 | 0.75 | 0.75 | 0.75 | 0.75 |
| Catalyst | 0.025 | 0.025 | 0.025 | 0.025 | 0.025 |
| Hydrosilating Agent | | | | | |
| II | 5.28 | 6.58 | — | — | — |
| VIII | — | — | 3 | 4 | 5 |
| Properties of TPV | | | | | |
| Average of | 2 | 2 | 2 | 2 | 2 |
| ISO Shore A | 69 | 68 | 67 | 70 | 71 |
| Ultimate Tensile Strength (MPa) | 3.58 | 4.53 | 3.58 | 4.51 | 4.55 |
| Ultimate Elongation (%) | 99 | 129 | 119 | 145 | 132 |
| M100 (MPa) | 4.42 | 4.22 | 3.61 | 3.84 | 4.18 |
| Compression Set (%) | 42 | 43 | 37 | 38 | 36 |
| Weight Gain (%) | 66 | 62 | 70 | 63 | 59 |

The data in Table IX shows that thermoplastic vulcanizates characterized by advantageous compression set can be obtained by practice of the present invention as compared to the use of hydrosilating agents that were employed in the prior art (i.e., Samples 51 and 52). Also, the data in Table IX suggests that practice of the present invention can produce thermoplastic vulcanizates characterized by improved long-term stability, as evidenced by improved compression set, even when the rubber includes those carbon-carbon double bonds that were believed to be efficiently cured by prior art hydrosilating agents.

Samples 56-59

Using procedures and ingredients similar to those employed in Samples 1-7 and 51-55, four additional thermoplastic vulcanizates were prepared and tested. The ingredients employed in each sample, including the curative, and the properties of the thermoplastic vulcanizates are set forth in Table X. The rubber employed in each sample was similar to that employed in Samples 27-34, which was a poly(ethylene-co-propylene-co-5-ethylidene-norbornene) including a diene content of about 9%. As with the previous samples, the stabilizer and antioxidant employed in Samples 56 and 57 were added after dynamic vulcanization. Also, 20 parts by weight of the white oil was added after dynamic vulcanization.

TABLE X

| | Samples | | | |
|---|---|---|---|---|
| | 56 | 57 | 58 | 59 |
| Invention/Comparison | I | I | C | C |
| 9% ENB Rubber | 200 | 200 | 200 | 200 |
| ZnO | 2 | 2 | 2 | 2 |
| Clay | 22 | 22 | 22 | 22 |
| White Oil | 5 | 5 | 5 | 5 |
| Thermolastic | 56 | 56 | 56 | 56 |
| White Oil | 20 | 20 | 20 | 20 |
| Hydrosilating Agent VIII | 4 | 5 | — | — |
| Catalyst | 0.069 | 0.069 | — | — |
| Stabilizer | 0.25 | 0.25 | — | — |
| Antioxidant | 0.75 | 0.75 | — | — |
| Phenolic Resin | — | — | 5.5 | 7.5 |
| Stannous Chloride | — | — | 1.5 | 1.5 |
| Properties of TPV | | | | |
| Average of | 3 | 3 | 2 | 2 |
| ISO Shore A | 71 | 73 | 70 | 71 |
| Ultimate Tensile Strength (MPa) | 7.20 | 7.19 | 7.19 | 7.19 |
| Ultimate Elongation (%) | 240 | 234 | 237 | 237 |
| M100 (MPa) | 4.25 | 4.33 | 4.29 | 4.29 |
| Compression Set (%) | 38 | 38 | 42 | 41 |
| Weight Gain (%) | 57 | 57 | 63 | 60 |

The data in Table X shows that practice of the present invention can yield thermoplastic vulcanizates characterized by advantageous compression set. Notably, the compression set of the samples of the present invention were improved over similar thermoplastic vulcanizates prepared by using a phenolic resin curative, which has conventionally been considered to provide superior compression set.

Samples 60-61

Using procedures and ingredients similar to those set forth in Samples 51-55, two additional thermoplastic vulcanizates were prepared and tested. Sample 60 included a poly(ethylene-co-propylene-co-5-ethylidene-2-norbornene) characterized by having a diene content of about 4.7 weight percent, a Mooney viscosity $ML_{(1+4)}$@125° C. of about 25, an intrinsic viscosity (dl/g) in Decalin of about 2.4 dl/g, a weight average molecular weight of about 180 kg/mole, a number average molecular weight of about 60 kg/mole, an ethylene content of about 57 weight percent, and the polymer was non-oil extended. Sample 61 employed a propylene based rubbery copolymer similar to that employed in Samples 38-40. The filler was an anhydrous aluminum silicate obtained under the tradename ICECAP™ K. The catalyst was a 2.2 weight percent active platinum catalyst with a cyclovinylsiloxane ligand obtained under the tradename PC085™.

TABLE XI

| | Samples | |
|---|---|---|
| | 60 | 61 |
| Invention/Comparison | I | I |
| Propylene-Based Rubber Copolymer | — | 100 |
| EPDM | 100 | — |
| Thermoplastic Resin | 75 | 75 |
| White Oil | 30 | 30 |
| Hydrosilating Agent VIII | 2.5 | 2.5 |
| Catalyst | 0.069 | 0.069 |
| White Oil | 20 | 20 |

TABLE XI-continued

| | Samples | |
|---|---|---|
| | 60 | 61 |
| Properties of TPV | | |
| Average of | 3 | 3 |
| ISO Shore A | 84 | 92 |
| Ultimate Tensile Strength (MPa) | 8.17 | 16.98 |
| Ultimate Elongation (%) | 237 | 349 |
| M50 (MPa) | 4.12 | 7.66 |
| M100 (MPa) | 5.37 | 9.61 |
| Aged Tension Set (%) | 13 | 16 |
| Compression Set (%) | 56 | 54 |
| Weight Gain (%) | 13 | 16 |

The data in Table XI shows that practice of the present invention can produce technologically useful thermoplastic vulcanizates by employing either conventional olefinic elastomers or propylene-based rubbery copolymers.

Various modifications and alterations that do not depart from the scope and spirit of this invention will become apparent to those skilled in the art. This invention is not to be duly limited to the illustrative embodiments set forth herein.

1. In a first numbered embodiment is a method for preparing a thermoplastic vulcanizate, the method comprising:

dynamically vulcanizing a rubber within a blend that includes the rubber and a thermoplastic polymer, where said dynamically vulcanizing is effected with a cure system that includes a hydrosilating agent and a catalyst, where the hydrosilating agent includes a compound including at least 3 silicon hydride groups defined by the formula

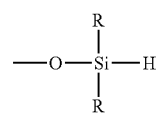

where each R is independently a monovalent organic group or hydrogen, and where the silicon atoms of the respective silicon hydride groups are spatially separated by at least 6 atoms.

2. The method of embodiment 1, where each R is independently selected from an alkyl group.

3. The method of embodiment 1 or 2, where the hydrosilating agent is defined by the formula

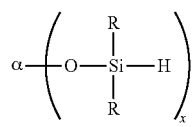

where each R is independently a monovalent organic group, where α is a moiety containing a sufficient number of atoms to allow at least 2 of the SiH-containing groups to be spatially separated by at least 6 atoms, and x is an integer of at least 3.

4. The method of any of the preceding embodiments, where the hydrosilating agent includes at least 3 substituents defined by the formula

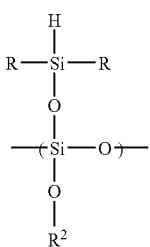

where each R is independently a monovalent organic group or hydrogen and each R² is independently a monovalent organic group or a silicon-containing moiety.

5. The method of any of the preceding embodiments, where the hydrosilating agent includes a substituent defined by the formula

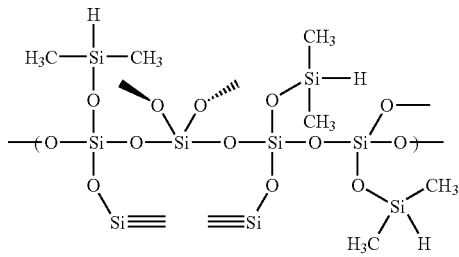

6. The method of any of the preceding embodiments, where the hydrosilating agent includes less than 20% of its silicon atoms positioned in groups defined by the formulae

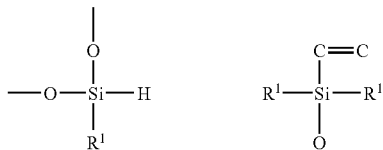

where each R¹ independently includes a monovalent organic group or hydrogen.

7. The method of numbered embodiment 2, where the hydrosilating agent is substantially devoid of silicon atoms positioned in groups defined by the formulae

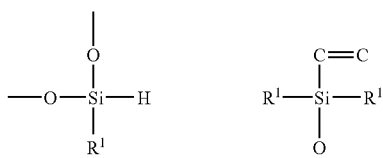

where each R¹ independently includes a monovalent organic group or hydrogen.

8. The method of numbered embodiment 3, where the hydrosilating agent is devoid of any silicon atoms positioned in groups defined by the formulae

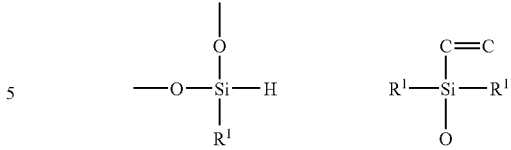

where each R¹ independently includes a monovalent organic group or hydrogen.

9. The method of any of the preceding embodiments, where the catalyst includes a group XIII metal.

10. The method of embodiment 9, where the catalyst is selected from the group consisting of chloroplatinic acid, elemental platinum, chloroplatinic acid hexahydrate, complexes of chloroplatinic acid with sym-divinyltetramethyldisiloxane, dichloro-bis(triphenylphosphine) platinum (II), cis-dichloro-bis(acetonitrile) platinum (II), dicarbonyldichloroplatinum (II), platinum chloride, and platinum oxide, zero valent platinum metal complexes, solid platinum supported on a carrier, platinum-vinylsiloxane complexes platinum-phosphine complexes, and platinum-phosphite complexes, $RhCl(PPh_3)_3$, $RhCl_3$, $Rh/Al_2O_3$, $RuCl_3$, $IrCl_3$, $FeCl_3$, $AlCl_3$, $PdCl_2 \cdot 2H_2O$, $NiCl_2$, $TiCl_4$, and mixtures thereof.

11. The method of any of the preceding embodiments, where the ratio of equivalents of silicon hydride groups associated with the hydrosilating agent to the equivalents of vinyl double bonds associated with the rubber is from about 0.7:1 to about 10:1.

12. The method of embodiment 11, where the ratio of equivalents of silicon hydride groups associated with the hydrosilating agent to the equivalents of vinyl double bonds associated with the rubber is from about 0.95:1 to about 7:1.

13. The method of embodiment 11, where the ratio of equivalents of silicon hydride groups associated with the hydrosilating agent to the equivalents of vinyl double bonds associated with the rubber is from about 1.5:1 to about 4:1.

14. The method of any of the preceding embodiments, where the amount of catalyst present is from about 0.00007 parts by weight to about 0.01 parts by weight per 100 parts by weight rubber.

15. The method of any of the preceding embodiments, where the rubber includes an olefinic elastomeric copolymer including one or more diene units deriving from 5-ethylidene-2-norbornene.

16. The method of claim 15, where the olefinic elastomeric copolymer includes at least 3% by weight units deriving from 5-ethylidene-2-norbornene.

17. A thermoplastic vulcanizate prepared by the method of any one of the preceding numbered embodiments.

What is claimed is:
1. A method for preparing a thermoplastic vulcanizate, the method comprising:
dynamically vulcanizing a rubber within a blend that excludes functionalized resins and includes the rubber and a thermoplastic polymer at a temperature above the melting point of the thermoplastic polymer, where the rubber includes an olefinic elastomeric copolymer including one or more diene units deriving from 5-ethylidene-2-norbornene, where said dynamically vulcanizing is effected with a cure system that includes a hydrosilating agent and a catalyst, where the hydrosilating agent includes a compound including at least 3 silicon hydride groups defined by the formula

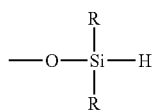

where each R is independently a monovalent organic group or hydrogen, and where the silicon atoms of the respective silicon hydride groups are spatially separated by at least 6 atoms, where the ratio of equivalents of silicon hydride groups associated with the hydrosilating agent to the equivalents of vinyl double bonds associated with the rubber is from about 0.7:1 to about 10:1.

2. The method of claim 1, where each R is independently selected from an alkyl group.

3. The method of claim 2, where the hydrosilating agent is substantially devoid of silicon atoms positioned in groups defined by the formulae

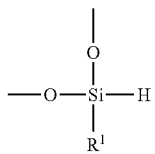 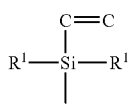

where each $R^1$ independently includes a monovalent organic group or hydrogen.

4. The method of claim 1, where the hydrosilating agent is defined by the formula

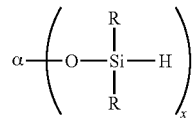

where each R is independently a monovalent organic group, where α is a moiety containing a sufficient number of atoms to allow each of the SiH-containing groups to be spatially separated by at least 6 atoms, and x is an integer of at least 3.

5. The method of claim 4, where the hydrosilating agent is devoid of any silicon atoms positioned in groups defined by the formulae

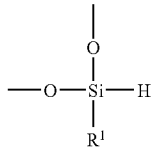 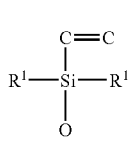

where each $R^1$ independently includes a monovalent organic group or hydrogen.

6. The method of claim 1, where the hydrosilating agent includes at least 3 substituents defined by the formula

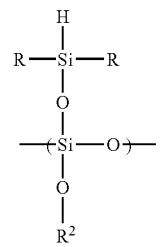

where each R is independently a monovalent organic group or hydrogen and each $R^2$ is independently a monovalent organic group or a silicon-containing moiety.

7. The method of claim 1, where the hydrosilating agent includes a substituent defined by the formula

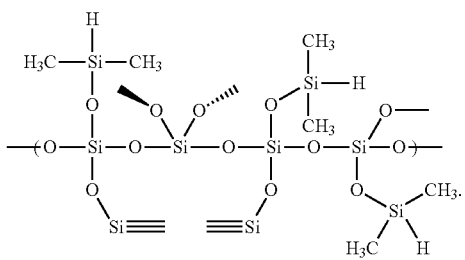

8. The method of claim 1, where the hydrosilating agent includes less than 20% of its silicon atoms positioned in groups defined by the formulae

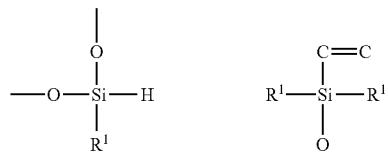

where each $R^1$ independently includes a monovalent organic group or hydrogen.

9. The method of claim 1, where the catalyst includes a group VIII metal.

10. The method of claim 1, where the catalyst is selected from the group consisting of chloroplatinic acid, elemental platinum, chloroplatinic acid hexahydrate, complexes of chloroplatinic acid with sym-divinyltetramethyldisiloxane, dichioro-bis(triphenylphosphine) platinum (II), cis-dichloro-bis(acetonitrile) platinum (II), dicarbonyldichloroplatinum (II), platinum chloride, and platinum oxide, zero valent platinum metal complexes, solid platinum supported on a carrier, platinum-vinylsiloxane complexes platinum-phosphine complexes, and platinum-phosphite complexes, $RhCl(PPh_3)_3$, $RhCl_3$, $Rh/Al_2O_3$, $RuCl_3$, $IrCl_3$, $FeCl_3$, $AlCl_3$, $PdCl_2 \cdot 2H_2O$, $NiCl_2$, $TiCl_4$, and mixtures thereof.

11. The method of claim 1, where the ratio of equivalents of silicon hydride groups associated with the hydrosilating agent to the equivalents of vinyl double bonds associated with the rubber is from about 0.95:1 to about 7:1.

12. The method of claim 11, where the ratio of equivalents of silicon hydride groups associated with the hydrosilating agent to the equivalents of vinyl double bonds associated with the rubber is from about 1.5:1 to about 4:1.

13. The method of claim 1, where the amount of catalyst present is from about 0.00007 parts by weight to about 0.069 parts by weight per 100 parts by weight rubber.

14. The method of claim 1, where the olefinic elastomeric copolymer includes at least 3% by weight units deriving from 5-ethylidene-2-norbornene.

15. The method of claim 1, where the rubber includes a second rubber including one or more units deriving from 5-vinyl-2-norbornene, or where the rubber includes a second rubber that is a tetrapolymer including units deriving from both 5-ethylidene-2-norbornene and 5-vinyl-2-norbornene.

16. The method of claim 1, where the amount of catalyst present is from about 0.0001 to about 0.0005 parts by weight per 100 parts by weight rubber.

17. The method claim 1, where the amount of catalyst present is from about 0.0005 to about 0.001 parts by weight per 100 parts by weight rubber.

18. The method of claim 1, where said step of dynamically vulcanizing the rubber cures the rubber to an extent where not more than 10 wt % rubber is extractable in cyclohexane at 23° C.

19. The method of claim 1, where said step of dynamically vulcanizing the rubber cures the rubber to an extent where not more than 5 wt % rubber is extractable in cyclohexane at 23° C.

20. The method of claim 1, where the olefinic elastomeric copolymer includes at least 4% by weight units deriving from 5-ethylidene-2-norbornene.

21. The method of claim 1, where the olefinic elastomeric copolymer includes from about 5 to about 12% by weight units deriving from 5-ethylidene -2-norbornene.

22. The method of claim 1, where the amount of catalyst present is from about 0.0001 to about 0.0005 parts by weight per 100 parts by weight rubber, where said step of dynamically vulcanizing the rubber cures the rubber to an extent where not more than 10 wt % rubber is extractable in cyclohexane at 23° C., and where the olefinic elastomeric copolymer includes at least 4% by weight units deriving from 5-ethylidene-2-norbornene.

23. The method of claim 22, where the olefinic elastomeric copolymer consists essentially of units deriving from ethylene, units deriving from α-olefin, and 5-ethylidene-2-norbornene units.

24. The method of claim 23, where the olefinic elastomeric copolymer is selected from the group consisting of ethylene-propylene rubber, propylene-based rubbery copolymers, and ethylene-based plastomers.

25. The method claim 1, where the amount of catalyst present is from about 0.0005 to about 0.001 parts by weight per 100 parts by weight rubber, where said step of dynamically vulcanizing the rubber cures the rubber to an extent where not more than 5 wt % rubber is extractable in cyclohexane at 23° C., and where the olefinic elastomeric copolymer includes from about 5 to about 12% by weight units deriving from 5-ethylidene -2-norbornene.

26. The method of claim 25, where the olefinic elastomeric copolymer consists essentially of units deriving from ethylene, units deriving from α-olefin, and 5-ethylidene-2-norbornene units.

27. The method of claim 1, where the thermoplastic polymer has a melt temperature from about 110° C. to about 250° C.

28. The method of claim 27, wherein the thermoplastic polymer is polypropylene.

29. A thermoplastic vulcanizate prepared by:
dynamically vulcanizing a rubber within a blend that excludes functionalized resins and includes the rubber and a thermoplastic polymer at a temperature above the melting point of the thermoplastic polymer, where the rubber includes an olefinic elastomeric copolymer including one or more diene units deriving from 5-ethylidene-2-norbornene, where said dynamically vulcanizing is effected with a cure system that includes a hydrosilating agent and a catalyst, where the hydrosilating agent includes a compound including at least 3 silicon hydride groups defined by the formula

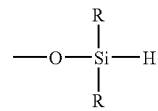

where each R is independently a monovalent organic group or hydrogen, where the silicon atoms of the respective silicon hydride groups are spatially separated by at least 6 atoms, where the ratio of equivalents of silicon hydride groups associated with the hydrosilating agent to the equivalents of vinyl double bonds associated with the rubber is from about 0.7:1 to about 10:1.

* * * * *